(12) United States Patent
Kinomura

(10) Patent No.: US 11,942,789 B2
(45) Date of Patent: Mar. 26, 2024

(54) POWER SUPPLY SYSTEM AND POWER SUPPLY METHOD

(71) Applicant: TOYOTA JIDOSHA KABUSHIKI KAISHA, Toyota (JP)

(72) Inventor: Shigeki Kinomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/885,979

(22) Filed: Aug. 11, 2022

(65) Prior Publication Data
US 2023/0049338 A1 Feb. 16, 2023

(30) Foreign Application Priority Data
Aug. 16, 2021 (JP) .................. 2021-132276

(51) Int. Cl.
*H02J 3/32* (2006.01)
*B60L 55/00* (2019.01)
*H02J 7/00* (2006.01)

(52) U.S. Cl.
CPC ............. *H02J 3/322* (2020.01); *B60L 55/00* (2019.02); *H02J 7/0045* (2013.01); *H02J 7/0047* (2013.01); *H02J 7/0063* (2013.01); *H02J 2207/20* (2020.01)

(58) Field of Classification Search
None
See application file for complete search history.

(56) References Cited

U.S. PATENT DOCUMENTS

| | | | |
|---|---|---|---|
| 2012/0323386 A1* | 12/2012 | Ito | B60L 53/63 700/291 |
| 2014/0191569 A1 | 7/2014 | Sawada et al. | |
| 2020/0406771 A1* | 12/2020 | Okumura | H02J 3/381 |
| 2021/0061123 A1* | 3/2021 | Suzuki | H01M 10/425 |

FOREIGN PATENT DOCUMENTS

JP 5123419 B1 1/2013

* cited by examiner

*Primary Examiner* — Jared Fureman
*Assistant Examiner* — Aqeel H Bukhari
(74) *Attorney, Agent, or Firm* — Dinsmore & Shohl LLP

(57) ABSTRACT

Provided is a power supply system configured to supply AC power to a building. The power supply system includes a discharge assembly which is connectable to a discharge port provided in a vehicle. The discharge assembly includes a first end which receives electric power from the discharge port connected thereto, and a second end which outputs AC power. The second end of the discharge assembly is connected to the building by a single-phase three-line wiring.

14 Claims, 18 Drawing Sheets

POWER SUPPLY SYSTEM AND POWER SUPPLY METHOD

This non-provisional application is based on Japanese Patent Application No. 2021-132276 filed on Aug. 16, 2021 with the Japan Patent Office, the entire contents of which are hereby incorporated by reference.

BACKGROUND

Field

The present disclosure relates to a power supply system and a power supply method.

Description of the Background Art

Japanese Patent No. 5123419 discloses a technique for identifying whether a connector connected to an inlet of a vehicle is a charge connector or a power supply connector.

SUMMARY

In recent years, vehicles (especially, electrically-powered vehicles) have attracted attention as an emergency power supply for buildings. A vehicle imparted with a V2H (Vehicle to Home) function can supply electric power to a building short of electric power. In order to impart the V2H functionality to the vehicle, it is required to connect a discharge assembly such as a discharge connector to a discharge port of the vehicle. For example, Japanese Patent No. 5123419 discloses a power supply connector as the discharge assembly.

In a building, it is quite often that a plurality of types of AC power having different voltages are used. However, in the discharge assembly (the power supply connector) disclosed in Japanese Patent No. 5123419, only one type of electric power is taken out from the discharge port (the inlet) of the vehicle. Therefore, it is difficult to supply a plurality of types of AC power having different voltages to the building by using the electric power taken out from the vehicle.

The present disclosure has been made to solve the problems mentioned above, and an object of the present disclosure is to supply a plurality of types of AC power having different voltages to a building by using a discharge assembly connected to a discharge port of a vehicle.

A power supply system according to a first aspect of the present disclosure is configured to supply AC power to a building. The power supply system includes a discharge assembly which is connectable to a discharge port provided in a vehicle. The discharge assembly includes a first end which receives electric power from the discharge port connected thereto and a second end which outputs AC power. The second end of the discharge assembly and the building are connected to each other by a single-phase three-line wiring.

According to the configuration mentioned above, since the second end of the discharge assembly and the building are connected to each other by a single-phase three-line wiring, it is possible to supply a plurality of types of AC power having different voltages to the building, which makes it possible to use the AC power having different voltages in the building.

Examples of the building include a house, a factory, a school, a hospital, and a commercial facility.

The power supply system may further include a switcher which connects one of a first power path and a second power path and disconnects the other. The first power path is a path for transferring electric power supplied from the discharge assembly to the building. The second power path is a path for transferring electric power supplied from a power grid to the building.

According to the configuration mentioned above, when the building becomes unable to receive electric power from the power grid, it is possible for the building to receive electric power from the vehicle through the intermediary of the discharge assembly.

The building may be provided with a distribution board. The switcher may be configured to maintain the second power path in a connected state while electric power is being supplied from the power grid to the distribution board, and to disconnect the second power path and connect the first power path when no electric power is supplied from the power grid to the distribution board.

According to the configuration mentioned above, when no electric power is supplied from the power grid to the distribution board, the power path is automatically switched, which eliminates the need for the user to manually operate the switcher.

The building may be provided with a first outlet and a second outlet to which a single-phase AC power is input from the switcher. The first outlet may output a single-phase AC power having a voltage of 95 V or more and 150 V or less. The second outlet may output a single-phase AC power having a voltage of 190 V or more and 300 V or less.

According to the configuration mentioned above, it is possible to use an electric apparatus having a driving voltage around single-phase AC 200 V and an electric apparatus having a driving voltage around single-phase AC 100 V in the building.

The single-phase three-line wiring that connects the second end of the discharge assembly and the building to each other may include a first voltage line, a second voltage line, and a neutral line. The vehicle may apply a single-phase AC voltage between the first voltage line and the neutral line and between the second voltage line and the neutral line.

According to the configuration mentioned above, it is possible to supply a single-phase AC power of different voltages to the building through the single-phase three-line wiring.

The discharge assembly may further include a converter which converts a single-phase two-line wiring into a single-phase three-line wiring. The first end of the discharge assembly and the converter may be connected to each other by the single-phase two-line wiring. The converter and the second end of the discharge assembly may be connected to each other by the single-phase three-line wiring.

According to the configuration mentioned above, it is possible to connect the second end of the discharge assembly and the building to each other by the single-phase three-line wiring.

The first end to the second end of the discharge assembly may be connected to each other by a single-phase three-line wiring. According to this configuration, it is possible to connect the second end of the discharge assembly and the building to each other by the single-phase three-line wiring.

The discharge assembly may be a discharge connector having the first end and the second end as described above. According to this configuration, since the discharge connector itself functions as a discharge assembly, it is possible to reduce the size of the discharge assembly.

Alternatively, the discharge assembly may further include a discharge connector, a housing which houses a circuit electrically connected to the discharge connector, and a cable which connects the discharge connector and the housing to each other. The discharge connector may have the first end of the discharge assembly, and the housing may have the second end of the discharge assembly.

According to the configuration mentioned above, since the discharge connector having the first end and the housing having the second end are connected to each other through the cable, it is possible to arrange the input end (the first end) of the discharge assembly connectable to the discharge port of the vehicle and the output end (the second end) of the discharge assembly connected to the building at positions apart from each other, which increases the degree of freedom of arrangement. Further, since a part of the discharge circuit may be housed in the housing, it is possible to reduce the size of the discharge connector.

The first end of the discharge assembly may include a detection terminal which outputs a connector signal indicating a requested voltage value of the discharge assembly to the vehicle side. According to this configuration, it is possible for the vehicle to apply a voltage matching the voltage of the discharge assembly (in other words, a voltage requested by the discharge assembly) to the discharge assembly.

The connector signal may be a potential signal indicating a state of the discharge assembly and the discharge port in addition to the requested voltage value. The discharge assembly may further include a detection circuit that changes a potential of the detection terminal in response to the state of the discharge assembly and the discharge port. According to this configuration, it is possible for the vehicle to determine the state of the discharge assembly and the discharge port (for example, whether or not the discharge assembly and the discharge port are connected to each other), which makes it possible to supply the electric power to the discharge assembly at an appropriate timing.

According to a second aspect of the present disclosure, there is provided a power supply method which includes: determining whether an operation mode of a power supply system configured to supply AC power to a building is a first operation mode or a second operation mode, the first operation mode being an operation mode in which AC power is supplied from a vehicle to the building, the second operation mode being an operation mode in which AC power is supplied from a power grid to the building; determining whether a discharge assembly is connected to a discharge port provided in the vehicle; and supplying electric power from the vehicle to the discharge assembly and supplying single-phase AC power from the discharge assembly to the building through a single-phase three-line wiring when it is determined that the operation mode of the power supply system is the first operation mode and the discharge assembly is connected to the discharge port.

According to the method mentioned above, it is also possible for the discharge assembly connected to the discharge port of the vehicle to supply a plurality of types of AC power having different voltages to the building in a similar manner to the power supply system mentioned above.

The vehicle may be an electrically-powered vehicle (hereinafter, also referred to as "xEV"). The xEV is a vehicle that utilizes electric power as the whole or a part of motive power source. The xEV includes a battery electric vehicle (BEV), a plug-in hybrid electric vehicle (PHEV) and a fuel cell electric vehicle (FCEV).

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
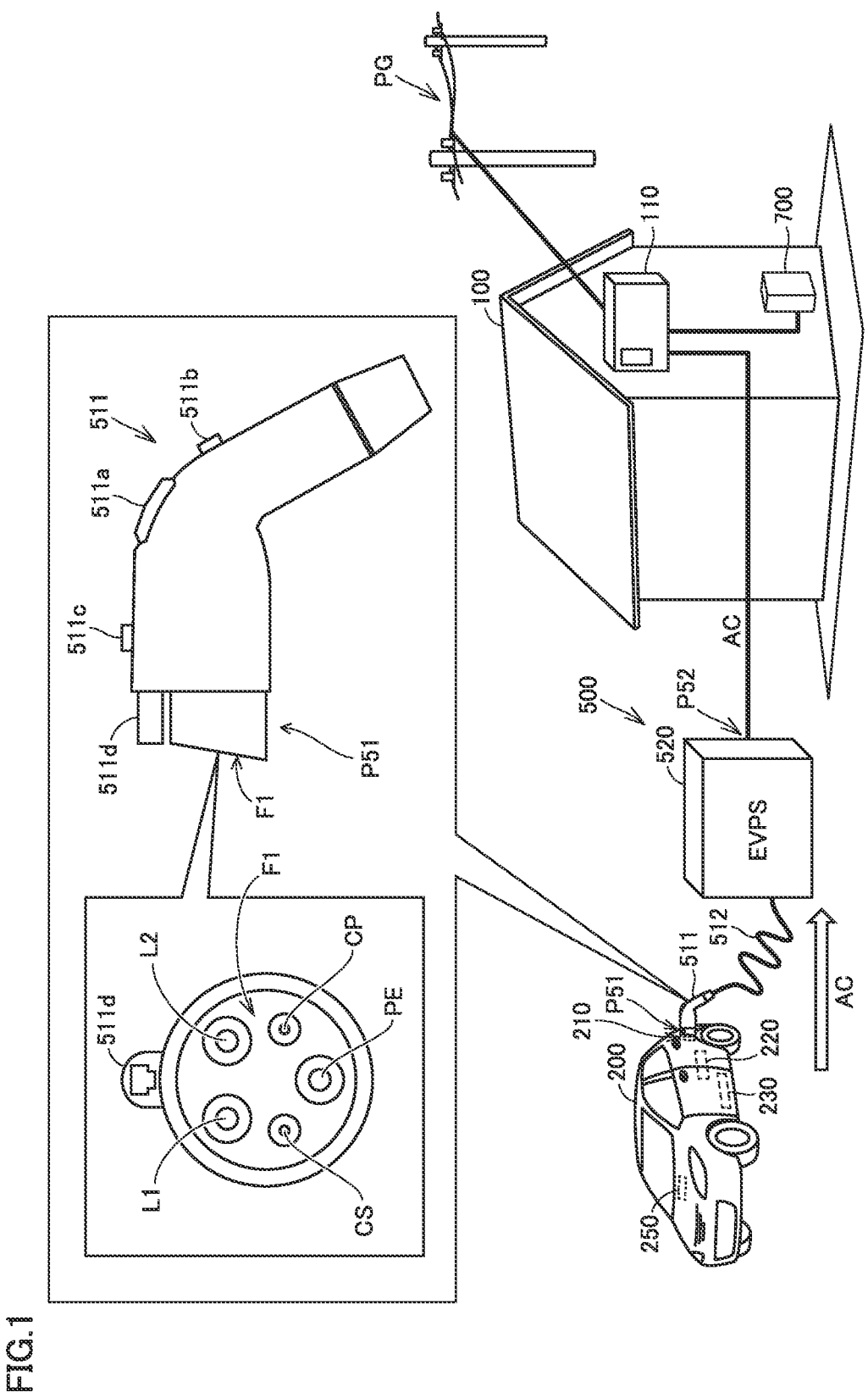
FIG. 1 is an overall configuration diagram of a power supply system according to an embodiment of the present disclosure.

An embodiment of the present disclosure will be described in detail with reference to the drawings. In the drawings, the same or corresponding portions are denoted by the same reference numerals, and the description thereof will not be repeated. Hereinafter, an electronic control unit (ECU) will be referred to as "ECU", an electric vehicle power system will be referred to as "EVPS", and a power conditioning system will be referred to as "PCS". In addition, an alternating current may be referred to as "AC", and a direct current may be referred to as "DC".

FIG. 1 is an overall configuration diagram of a power supply system according to the present embodiment. With reference to FIG. 1, the power supply system according to the present embodiment is applied to a V2H (Vehicle to Home) in which electric power is supplied from a vehicle to electric wirings disposed in the building. V2H is roughly classified into categories 1 to 4. In category 1, the vehicle is not connected (has no grid connection) to the power grid, and supplies electric power to a dedicated grid-independent outlet which is connected to the electric wirings disposed in the building. The dedicated grid-independent outlet is such an outlet that is installed in the building and is disconnected from the power grid. For example, when a power failure occurs in the power grid, electric power is supplied from the vehicle to the dedicated grid-independent outlet. In category 2, the vehicle is not directly connected (has no direct grid connection) to the power grid, but may be switched to the power grid by a switcher so that electric power is supplied from the power grid or the vehicle to the building. In category 3, the vehicle is connected (has grid connection) to the power grid through a power converter, and supplies electric power to the electric wirings disposed in the building. However, no reverse power flow to the power grid is present in category 3. In category 4, the vehicle is connected (has grid connection) to the power grid through the power converter, and supplies electric power to the electric wirings disposed in the building. Reverse power flow to the power grid is present in category 4. The power grid is a transmission and distribution network system (commercial power grid) for supplying electric power from an electric power provider to an electric power user. A power failure means that the voltage of a power supply drops to a range less than the input voltage.

The power supply system according to the present embodiment is configured to perform V2H of categories 2 and 4. Specifically, the power supply system according to the present embodiment includes a vehicle 200 and a discharge assembly 500, and is configured to supply AC power supplied from the vehicle 200 to the building 100 through the intermediary of the discharge assembly 500. The discharge assembly 500 corresponds to a portion of a discharge coupling system that is connected to an inlet 210 of the vehicle 200. The configuration of the discharge assembly 500 will be described later.

In the present embodiment, the building 100 is a house. The building 100 includes a distribution board 110 that receives electric power supplied from a power grid PG. A power load 700 is electrically connectable to the distribution board 110. The building 100 is equipped with an electric apparatus that supplies electric power to the power load 700, the details of which will be described later. The power load 700 includes electric devices (for example, home electro-mechanical devices) to be used in the building 100. Examples of the power load 700 include a lighting device, an air conditioning device, a cooking device, an information device, a television, a refrigerator, and a laundry machine.

Although the vehicle 200 may be any vehicle equipped with a discharge function, in the present embodiment, the vehicle 200 is a battery electric vehicle (BEV) that is not provided with an engine (internal combustion engine). The vehicle 200 includes an inlet 210 (vehicle inlet), a charge/discharge device 220, a battery 230, and an ECU 250. The inlet 210 corresponds to an example of a "discharge port" according to the present disclosure. The inlet 210 corresponds to a portion of a discharge coupling system that is fixed in the vehicle 200. The battery 230 includes, for example, a secondary battery. The secondary battery may be a lithium ion battery or a nickel-hydrogen battery. The battery 230 may include one or more power storage devices selected from the group consisting of a liquid secondary battery, an all-solid secondary battery, an assembled battery, and an electric double-layer capacitor. The vehicle 200 is configured to be able to travel using electric power stored in the battery 230. The vehicle 200 includes an electric motor (not shown) that receives electric power supplied from the battery 230, and travels using motive power generated by the electric motor. The battery 230 corresponds to a vehicle-mounted driving battery.

The discharge assembly 500 is connectable to the inlet 210 provided in the vehicle 200. The discharge assembly 500 includes a discharge connector 511, an EVPS box (housing) 520 which houses an EVPS circuit electrically connected to the discharge connector 511, and a cable 512 which connects the discharge connector 511 and the EVPS box 520 to each other. The discharge assembly 500 has a first end P51 which is connectable to the inlet 210 of the vehicle 200 and a second end P52 which outputs AC power to the building 100. In the discharge assembly 500 according to the present embodiment, the discharge connector 511 has the first end P51 of the discharge assembly 500. The electric power is input to the first end P51 from the inlet 210 connected to the first end P51. The EVPS box 520 has the second end P52 of the discharge assembly 500. The second end P52 of the discharge assembly 500 is electrically connected to the electric wiring disposed in the building 100, the details of which will be described later.

The EVPS box 520 corresponds to a main body of the EVPS. The EVPS is configured to control a charge operation performed on the vehicle and a discharge operation performed by the vehicle. The charge operation refers to an operation of supplying electric power from the EVPS to the vehicle. The charged power is supplied to a vehicle-mounted driving battery and/or a vehicle-mounted device. The discharge operation refers to an operation of supplying electric power from a vehicle generator and/or a vehicle-mounted driving battery to a power load through the intermediary of the EVPS. The EVPS box 520 may include an indicator. The discharge assembly 500 includes an EVPS and a charge/discharge cable assembly. The charge/discharge cable assembly is a cable assembly configured to connect the vehicle and the EVPS to each other, and includes a charging/discharging connector to be connected to the vehicle. In the discharge assembly 500, the discharge connector 511 functions as a charge/discharge connector. The cable 512 functions as a charge/discharge cable.

The discharge connector 511 further includes a latch release button 511a, a discharge start switch 511b, a mode switcher 511c, and a latch 511d.

The latch release button 511a is configured to release the discharge connector 511 latched to the inlet 210, and cause the vehicle 200 (for example, the ECU 250) to detect a state (a connected state, a fitted state, or a non-fitted state) between the discharge connector 511 and the inlet 210. Hereinafter, the state of the discharge connector 511 and the inlet 210 will be referred to as the "connector state". The latch 511d is configured to engage with the inlet 210 so as to fix (latch) the discharge connector 511 to the inlet 210. For example, when a tip of the latch 511d is caught in a recess formed in the inlet 210, the discharge connector 511 is latched. The latch 511d is interlocked with the latch release button 511a. When the latch release button 511a is pressed by the user, the latch is released.

When the user inserts the discharge connector 511 into the inlet 210 and fits the discharge connector 511 and the inlet 210 to each other without pressing the latch release button 511a, the discharge connector 511 and the inlet 210 are fixed by the latch 511d in such a manner that they are electrically connected to each other. This connector state corresponds to the "connected state". In the connected state, the discharge connector 511 is inserted into the inlet 210, all terminals of the discharge connector 511 and the inlet 210 are electrically connected, and the discharge connector 511 is latched. When the user presses the latch release button 511a in the connected state, the fixation by the latch 511d is released. This connector state corresponds to the "fitted state". In the fitted state, the discharge connector 511 is inserted into the inlet 210, and all the terminals of the discharge connector 511 and the inlet 210 are electrically connected, but the discharge connector 511 is not latched. When the user pulls the discharge connector 511 out of the inlet 210 in the fitted state, the connector state becomes "non-fitted state". The non-fitted state corresponds to a state other than the connected state and the fitted state. When the connector state is the connected state or the fitted state, the traveling of the vehicle 200 is prohibited by the ECU 250.

The discharge start switch 511b is configured to change a PISW signal (a signal from a terminal CS), and thereby causing the vehicle 200 (for example, the ECU 250) to detect the start of discharge operation. In the present embodiment, the PISW signal is a potential signal. The details of the PISW signal will be described later (see FIG. 13).

The mode switcher 511c is configured to switch the operation mode of the power supply system. The user can operate the mode switcher 511c so as to select a desired operation mode. The power supply system according to the present embodiment is capable of operating in two operation modes, and more specifically, the power supply system is configured to operate in any operation mode selected by the mode switcher 511c from a normal operation mode and a grid independent operation mode (isolated operation mode). However, as to be described later, when a power path is not correctly selected by a switcher 525 (see FIG. 2), the charge/discharge operation will not be performed. In the present embodiment, the mode switcher 511c and the switcher 525 are manually operated by the user. The switcher 525 may be interlocked with the mode switcher 511c. However, the present disclosure is not limited thereto, and the mode switcher 511c may be omitted, and the operation mode of the power supply system may be switched by the switcher 525. The switcher 525 may also be electronically controlled. For example, when a power failure occurs in the power grid PG, the power path may be automatically switched to the discharge path for the grid independent operation mode by the switcher 525.

In the normal mode, the charge/discharge control of the vehicle 200 is performed by the energy management function of the EVPS built in the EVPS box 520. The charge/discharge control of the vehicle 200 is performed based on communications such as CPLT (Control Pilot) and HLC (High Level Communication) from the EVPS box 520 to the vehicle 200. The CPLT is defined in, for example, the standard "IEC/TS 62763:2013". The CPLT signal is a pulse width modulation (PWM) signal used in the communication between the vehicle and the EVPS. As will be described in detail later, when the operation mode is switched by the mode switcher 511c between the normal mode and the grid independent operation mode, the resistance value (proximity detection signal resistance) of the discharge connector 511 and the connection/disconnection of the CPLT line change accordingly. In the normal mode, the CPLT line is connected, and in the grid independent operation mode, the CPLT line is disconnected. The HLC is a digital communication by which information is interactively exchanged between the vehicle and the EVPS. In the charge/discharge control, information related to the vehicle and the EVPS is interactively exchanged through the HLC. The control signal in the normal mode may comply with, for example, the standards "IEC61851-1:2010", "ISO/IEC15118-2:2014", and "ISO/IEC15118-3:2015". The EVPS box 520 may be configured to perform energy management in the normal mode based on information (including instructions) from an external server (not shown).

In the present embodiment, when the user connects the discharge connector 511 of the discharge assembly 500 to the inlet 210 while the normal mode is being selected by the mode switcher 511c and the switcher 525, the charge/discharge operation is automatically performed. However, the present disclosure is not limited thereto, the user may manually operate the EVPS box 520 (for example, an operation unit such as a display) to start or stop the charge/discharge operation. Alternatively, the vehicle 200 may send a request to the discharge assembly 500 to start or stop the charge/discharge operation.

In the grid independent operation mode, the vehicle 200 and the discharge assembly 500 are connected to each other, and the vehicle 200 supplies electric power to the distribution board 110 in the building 100 through the discharge assembly 500. In the grid independent operation mode, the discharge assembly 500 is not connected (has no grid connection) to the power grid PG.

In the present embodiment, when the user switches the mode switcher 511c and the switcher 525 to the grid independent operation mode, connects the discharge connector 511 of the discharge assembly 500 to the inlet 210, and performs a predetermined operation on the discharge start switch 511b, the vehicle 200 recognizes the start of discharge operation and starts the discharge of electric power. When a predetermined discharge stop condition is satisfied after the start of discharge operation, the vehicle 200 recognizes the stop of discharge operation and stops the discharge of electric power. After the discharge operation is stopped, the user returns the mode switcher 511c and the switcher 525 to the normal mode. After the discharge operation is stopped in the grid independent operation mode, the display of the EVPS box 520 may prompt the user to return the mode switcher 511c and the switcher 525 to the normal mode.

Figure 2:
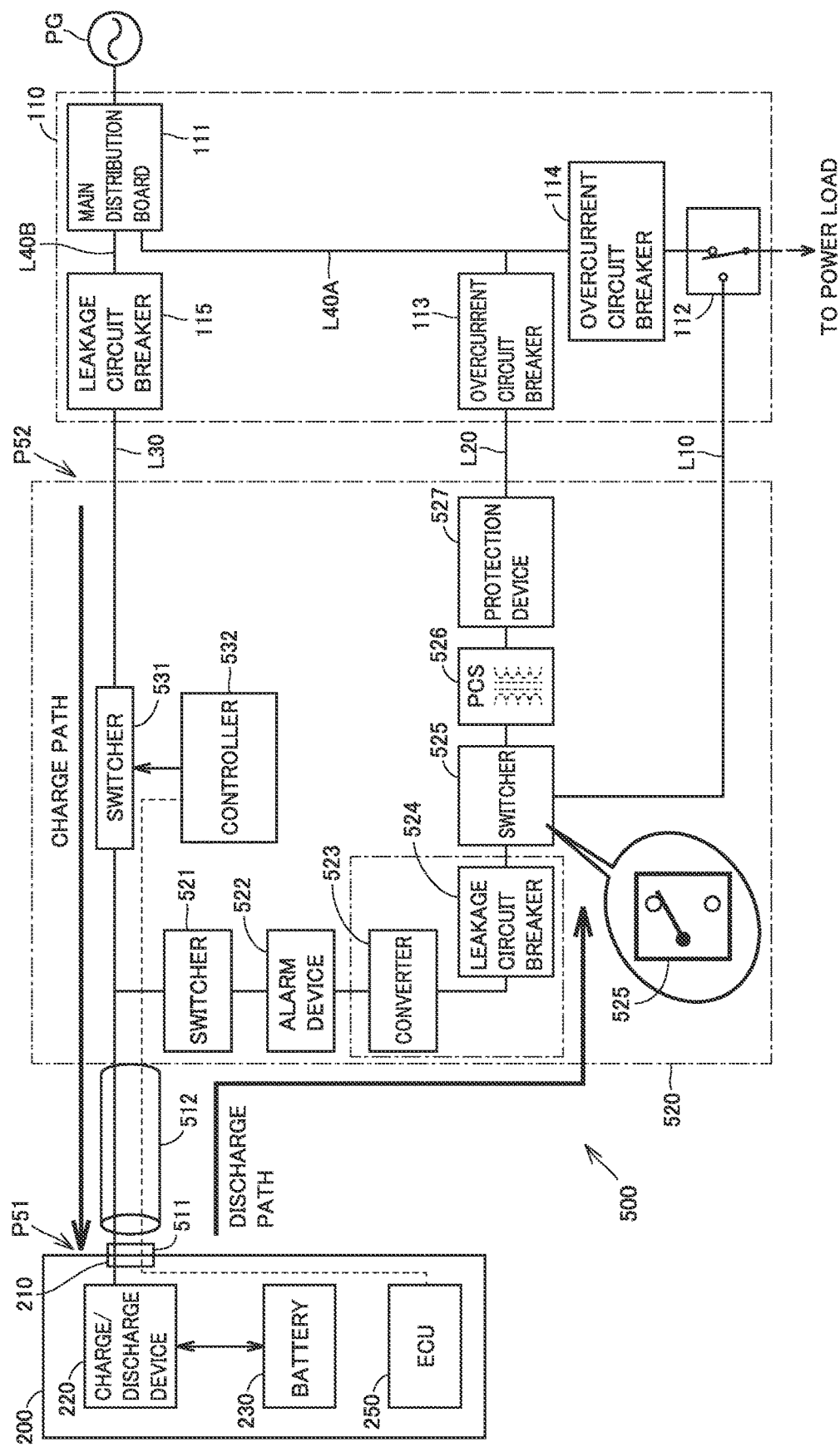
FIG. 2 is a circuit configuration diagram of the power supply system illustrated in FIG. 1.

FIG. 2 is a circuit configuration diagram of the power supply system according to the present embodiment. With reference to FIG. 2 as well as FIG. 1, the distribution board 110 includes a main distribution board 111, a switcher 112, an overcurrent circuit breaker 113, an overcurrent circuit breaker 114, and a leakage circuit breaker 115. The main distribution board 111 receives electric power supplied from the power grid PG, and distributes the electric power to a power path (charge path) connected to the vehicle 200 and a power path connected to the switcher 112. The main distribution board 111 is electrically connected to the switcher 112 through a single-phase three-line wiring L40A.

The discharge assembly 500 is provided with a charge path that connects the first end P51 (the inlet 210) and the second end P52 to each other. The charge path is connected to the distribution board 110 in the building 100 through a single-phase two-line wiring L30. The single-phase two-line wiring L30 is electrically connected to the main distribution board 111 of the distribution board 110 through a single-phase two-line wiring L40B. The leakage circuit breaker 115 is connected to the single-phase two-line wiring L40B. The AC power from the power grid PG is input to the charge path through the leakage circuit breaker 115. The leakage circuit breaker 115 is configured to disconnect the charge path when an electric leakage is detected. The leakage circuit breaker 115 corresponds to a charge leakage circuit breaker. In the present embodiment, a leakage circuit breaker provided with an overcurrent protection function is employed as the leakage circuit breaker 115. The leakage circuit breaker 115 is a high-sensitivity high-speed leakage circuit breaker.

The EVPS box 520 includes a switcher 521, an alarm device 522, a converter 523, a leakage circuit breaker 524, a switcher 525, a PCS 526, a protection device 527, a switcher 531, and a controller 532.

The switcher 531 is disposed on the charge path. The switcher 531 is configured to switch the connection/disconnection of the charge path. The switcher 531 corresponds to a charge switcher. The switcher 531 is interlocked with the switcher 521 in such a manner that when the switcher 521 connects the discharge path (during the discharge operation), the switcher 531 does not connect (close) the charge path.

The controller 532 is configured to exchange control signals with the ECU 250 of the vehicle 200. The controller 532 performs data communication (for example, CPLT and HLC) with the ECU 250. The controller 532 may be a computer including a processor. The controller 532 is configured to control the switcher 531. The controller 532 controls the switcher 531 to connect (close) the charge path only when it is determined that conditions for performing the charge operation are satisfied based on the communication with the vehicle 200, and to disconnect (open) the charge path otherwise. When at least one of the control signal and the data communication is not normal, the controller 532 controls the switcher 531 to disconnect the charge path. The controller 532 performs not only the charge control but also the discharge control in accordance with the communication with the vehicle 200.

The discharge assembly 500 is provided with a discharge path (hereinafter also referred to as a "common discharge path") that connects the first end P51 (the inlet 210) and the switcher 525 to each other. The switcher 521 is configured to switch the connection/disconnection of the common discharge path. The switcher 521 corresponds to a discharge switcher. The switcher 521 is interlocked with the switcher 521 in such a manner that when the switcher 531 connects the charge path (during the charge operation), the switcher 521 does not connect (close) the common discharge path.

The alarm device 522 is arranged between the switcher 521 and the converter 523, and is configured to notify an abnormality by, for example, displaying the abnormality or issuing an alarm when a ground fault is detected in the vehicle 200.

The converter 523 is configured to convert a power path connected to the vehicle 200 into an indoor power path suitable for the building 100. The converter 523 corresponds to an indoor power path converter. In the present embodiment, the converter 523 includes an insulation transformer. The grounding of a power path is configured to ground at one point in normal connection. In the present embodiment, a high-resistance neutral-point grounding system is employed.

The leakage circuit breaker 524 is arranged between the converter 523 and the switcher 525, and is configured to break the common discharge path when a ground fault or an electric leakage is detected in the building 100. The leakage circuit breaker 524 corresponds to a discharge leakage circuit breaker. In the present embodiment, a leakage circuit breaker provided with an overcurrent protection function is employed as the leakage circuit breaker 524. The leakage circuit breaker 524 is a high-sensitivity high-speed leakage circuit breaker. In the present embodiment, the converter 523 and the leakage circuit breaker 524 are housed in the same housing.

The switcher 525 is configured to switch between a discharge path for grid independent operation mode (hereinafter also referred to as a "first discharge path") and a discharge path for normal mode (hereinafter also referred to as a "second discharge path"). The first discharge path and the second discharge path connect the switcher 525 and the second end P52 to each other through different paths. In the present embodiment, the switcher 525 is operated by the user. The switcher 525 connects only a discharge path (any one of the first discharge path and the second discharge path) selected by the user.

The first discharge path is directly connected to the distribution board 110 in the building 100 through a single-phase three-line wiring L10. Therefore, the electric power supplied from the vehicle 200 to the indoor power path through the converter 523 is output to the building 100 without any change.

The second discharge path is connected to the distribution board 110 in the building 100 through a single-phase three-line wiring L20. The PCS 526 and the protection device 527 are disposed on the single-phase three-line wiring L20. During the grid connection, the AC power supplied from the vehicle 200 is supplied to the distribution board 110 through the PCS 526 and the protection device 527. The PCS 526 includes a power conversion circuit such as an insulation transformer. The protection device 527 includes a protection relay. The protection device 527 has a reverse power detection function.

In the present embodiment, the second end P52 of the discharge assembly 500 and the building 100 are connected to each other by the single-phase three-line wiring L10, the single-phase three-line wiring L20 and the single-phase two-line wiring L30. The power grid PG supplies charge power to the second end P52 of the discharge assembly 500 through the distribution board 110. More specifically, AC power is output from the distribution board 110 to the charge path (the single-phase two-line wiring L30). AC power is output from each of the first discharge path (the single-phase three-line wiring L10) and the second discharge path (the single-phase three-line wiring L20) at the second end P52 of the discharge assembly 500 to the distribution board 110. Hereinafter, the AC power output from the first discharge path to the distribution board 110 is referred to as a "first AC output", and the AC power output from the second discharge path to the distribution board 110 is referred to as a "second AC output".

The first AC output is input to the switcher 112 of the distribution board 110. Further, the AC power from the power grid PG is input to the switcher 112 through a single-phase three-line wiring L40A. The overcurrent circuit breaker 114 is arranged on the single-phase three-line wiring L40A. The overcurrent circuit breaker 114 disconnects the power path when an overcurrent is detected. The switcher 112 is configured to switch between the electric power from the power grid PG and the first AC output (grid independent power supply) from the discharge assembly 500. The switcher 112 is physically configured in such a manner that both contacts thereof will not be turned on at the same time so as to prevent the first AC output (grid independent power supply) from flowing into the power grid PG. In the present embodiment, the switcher 112 is operated by the user.

The second AC output is input to the single-phase three-line wiring L40A through the overcurrent circuit breaker 113 of the distribution board 110. The overcurrent circuit breaker 113 is configured to protect the output of the PCS 526 and the wiring of the distribution board 110. The overcurrent circuit breaker 113 disconnects the power path when an overcurrent is detected. In the normal mode, the second discharge path is connected. Thus, the vehicle 200 is connected (has grid connection) to the power grid PG through the discharge assembly 500 and the distribution board 110, and the energy management is performed by using the second AC output.

Figure 3:
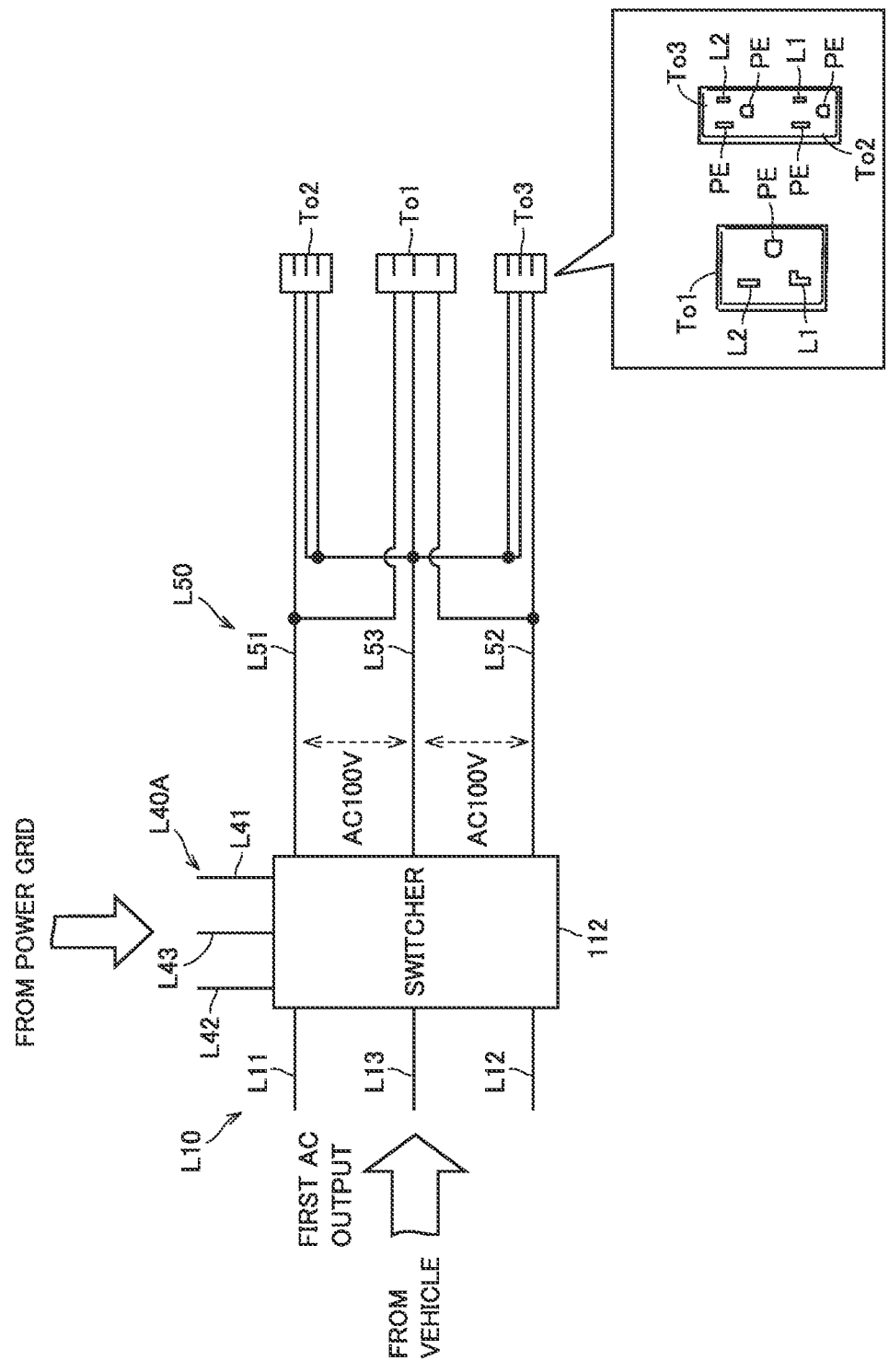
FIG. 3 is a diagram illustrating the configuration of a switcher illustrated in FIG. 2 and its surrounding components.

FIG. 3 is a diagram illustrating the configuration of the switcher 112 and its surrounding components. With reference to FIG. 3 as well as FIG. 2, the single-phase three-line wiring L10 and the single-phase three-line wiring L40A are connected to the switcher 112. The single-phase three-line wiring L10 includes a voltage line L11, a voltage line L12, and a neutral line L13. The voltage line L11, the voltage line L12, and the neutral line L13 correspond to an example of the "first voltage line", the "second voltage line", and the "neutral line" according to the present disclosure, respectively. The single-phase three-line wiring L40A includes a voltage line L41, a voltage line L42, and a neutral line L43. The switcher 112 is connected to a first outlet To1, a second outlet To2, and a third outlet To3 through a single-phase three-line wiring L50. The single-phase three-line wiring L50 includes a voltage line L51, a voltage line L52, and a neutral line L53. The first outlet To1, the second outlet To2, and the third outlet To3 are installed in the building 100, for example.

The switcher 112 is configured to connect one of a first power path and a second power path and disconnect the other. The first power path is a path for transferring electric power supplied from the discharge assembly 500 (more specifically, the electric power supplied from the vehicle 200 through the discharge assembly 500) to the power load 700. The second power path is a path for transferring electric power supplied from the power grid PG to the power load 700. The switcher 112 connects only the power path (one of the first power path and the second power path) selected by the user. Before the operation mode is switched to the grid independent operation mode, the user operates the switcher 112 to connect the first power path. Before the operation mode is switched to the normal mode, the user operates the switcher 112 to connect the second power path. When the operation mode is switched by the mode switcher 511c, the display of the EVPS box 520 may prompt the user to operate the switcher 112.

The connection of the first power path by using the switcher 112 means that the single-phase three-line wiring L10 and the single-phase three-line wiring L50 are electrically connected to each other by the switcher 112. When the first power path is connected by the switcher 112, the electric power supplied from the discharge assembly 500 to the switcher 112 is output from the switcher 112 to the first outlet To1, the second outlet To2 and the third outlet To3. The connection of the second power path by using the switcher 112 means that the single-phase three-line wiring L40A and the single-phase three-line wiring L50 are electrically connected to each other by the switcher 112. When the second power path is connected by the switcher 112, the electric power supplied from the power grid PG to the switcher 112 is output from the switcher 112 to the first outlet To1, the second outlet To2 and the third outlet To3.

The switcher 112 is configured to output the electric power of AC 100 V or AC 200 V through the voltage line L51, the voltage line L52 and the neutral line L53. When the first power path or the second power path is connected by the switcher 112, an AC power is supplied from the vehicle 200 (the discharge assembly 500) or the power grid PG, and thereby, a voltage of AC 100 V is applied between the voltage line L51 and the neutral line L53 and a voltage of AC 100 V is applied between the voltage line L52 and the neutral line L53.

As to each of the first outlet To1, the second outlet To2 and the third outlet To3, the outlet terminals (receptacle terminals) electrically connected to the voltage line L51, the voltage line L52 and the neutral line L53, respectively, are denoted by "L1", "L2" and "PE", respectively. As illustrated in FIG. 3, the first outlet To1 includes a first voltage terminal (L1), a second voltage terminal (L2), and a ground terminal (PE). The second outlet To2 includes one voltage terminal (L1) and two ground terminals (PE). The third outlet To3 includes one voltage terminal (L2) and two ground terminals (PE). The first outlet To1 outputs AC 200 V between L1 and L2. The second outlet To2 outputs AC 100 V between L1 and PE. The third outlet To3 outputs AC 100 V between L2 and PE. The first outlet To1 may be an outlet for a single-phase AC 200 V having a rated voltage of 250 V and a rated current of 20 A. Each of the second outlet To2 and the third outlet To3 may be an outlet for a single-phase AC 100 V having a rated voltage of 125 V and a rated current of 15 A.

As described above, AC 100 V/AC 200 V can be output from the single-phase three-line wiring L50. The first outlet To1, the second outlet To2 and the third outlet To3 may function as a power supply for the power load 700 illustrated in FIG. 1. For example, it is possible to use the first outlet To1 to drive an electric apparatus having a driving voltage of 200 V. Further, it is possible to use the second outlet To2 or the third outlet To3 to drive an electric apparatus having a driving voltage of 100 V. It is also possible to use a plurality of outlets simultaneously to drive a plurality of types of electrical apparatuses having different driving voltages. In the power supply system according to the present embodiment, the second end P52 of the discharge assembly 500 and the building 100 are connected to each other by the single-phase three-line wiring L10. Therefore, even if a single-phase AC power of 100 V/200 V is not supplied from the power grid PG to the distribution board 110, it is possible for the first outlet To1, the second outlet To2 and the third outlet To3 to receive the single-phase AC power of 100 V/200 V from the vehicle 200.

With reference to FIG. 1 again, the charge/discharge device 220 is configured to charge the battery 230. Specifically, the charge/discharge device 220 is configured to convert AC power supplied from the outside of the vehicle to the inlet 210 into DC power (AC/DC conversion), and output the DC power to the battery 230. The charge/discharge device 220 is also configured to discharge the electric power of the battery 230 to the outside of the vehicle. Specifically, the charge/discharge device 220 is configured to convert the DC power supplied from the battery 230 into AC power (DC/AC conversion), and output the AC power to the inlet 210.

Figure 4:
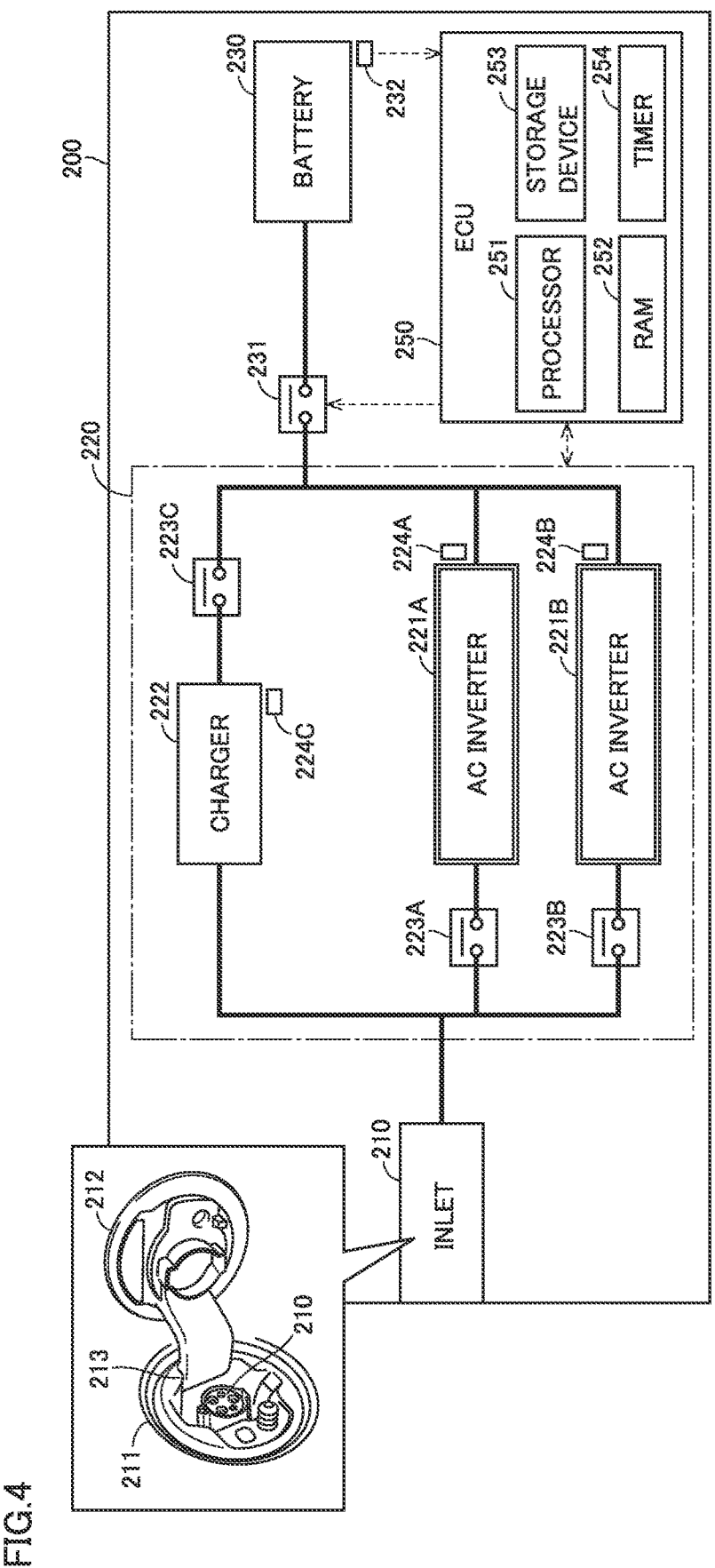
FIG. 4 is a diagram illustrating the configuration of a charge/discharge device illustrated in FIGS. 1 and 2 and its surrounding components.

FIG. 4 is a diagram illustrating the configuration of the charge/discharge device 220 and its surrounding components. With reference to FIG. 4, a system main relay (SMR) 231 is disposed between the charge/discharge device 220 and the battery 230. The SMR 231 is configured to switch the connection/disconnection of a power path that connects the charge/discharge device 220 and the battery 230 to each other. When the electric power is exchanged between the inlet 210 and the battery 230, the SMR 231 is brought into a closed state (connected state) by the ECU 250. The battery 230 is provided with a battery management system (BMS) 232. The BMS 232 includes various sensors configured to detect the state of the battery 230, and output the detection result to the ECU 250. The ECU 250 can obtain the state (for example, a temperature, a current, a voltage, a state of charge (SOC), and an internal resistance) of the battery 230.

The inlet 210 is disposed in an opening 211 provided in the vehicle body. A lid 212 is provided to open and close the opening 211. The lid 212 is coupled to the vehicle body through an opening/closing mechanism 213 (for example, a hinge) so as to open and close the opening 211. The inlet 210 is used when the lid 212 is open. When the lid 212 is closed, the lid 212 covers the opening 211 (including the inlet 210), thereby preventing the inlet 210 from being used. The inlet 210 according to the present embodiment is an AC inlet. Namely, when the inlet 210 is used to charge the battery 230, the AC power is input to the inlet 210 from the outside of the vehicle 200.

The ECU 250 is configured to control the charge/discharge device 220. The ECU 250 may be a computer. The ECU 250 includes a processor 251, a random access memory (RAM), a storage device 253, and a timer 254. In the present embodiment, when the processor 251 executes a program stored in the storage device 253 in the ECU 250, various controls are executed in the vehicle 200. However, various controls in the vehicle 200 are not limited to execution by software, and may be executed by dedicated hardware (electronic circuit). The number of processors included in the ECU 250 is arbitrary, and a predetermined processor may be provided for each control.

The charging/discharging device 220 includes an AC inverter 221A, an AC inverter 221B, and a charger 222 which are connected in parallel to each other between the inlet 210 and the battery 230. The AC inverter 221A and the AC inverter 221B may be housed in separate housings, or may be housed together in the same housing.

A discharge relay 223A is disposed between the AC inverter 221A and the inlet 210. The discharge relay 223A is configured to switch the connection/disconnection of a discharge path extending from the AC inverter 221A to the inlet 210. A discharge relay 223B is disposed between the AC inverter 221B and the inlet 210. The discharge relay 223B is configured to switch the connection/disconnection of a discharge path extending from the AC inverter 221B to the inlet 210. Hereinafter, when there is no need to distinguish the AC inverter 221A and the AC inverter 221B from each other, each of the AC inverters 221A and 221B may be referred to as the "AC inverter 221".

Figure 5:
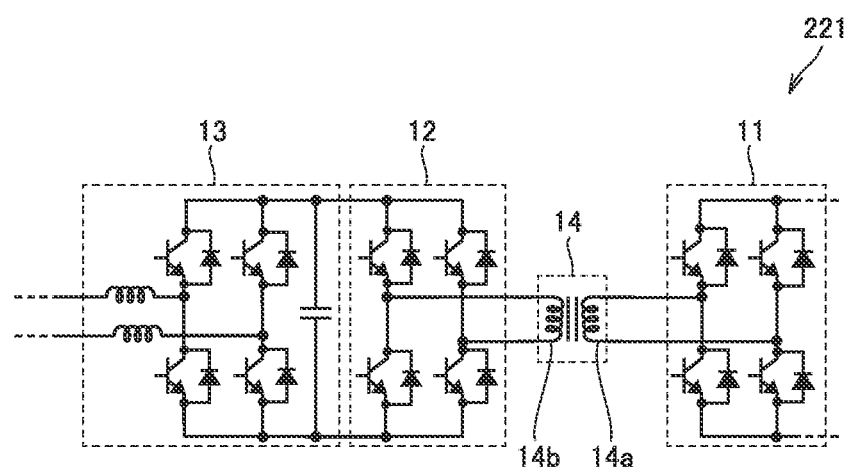
FIG. 5 is a diagram illustrating a circuit configuration example of a vehicle-mounted inverter illustrated in FIG. 4.

FIG. 5 is a diagram illustrating a circuit configuration example of the AC inverter 221. With reference to FIG. 5 as well as FIG. 4, the AC inverter 221 includes inverters 11 to 13 and an insulating circuit 14. Each of the inverters 11 to 13 includes a full bridge circuit including four switching elements. Among the inverters 11 to 13, the inverter 13 located closest to the inlet 210 further includes two reactors and one smoothing capacitor. Each switching element included in the inverters 11 to 13 is controlled by the ECU 250. The insulating circuit 14 is an insulation transformer that includes a first coil 14a and a second coil 14b.

The inverter 11 converts DC power received from the battery 230 into high-frequency AC power. The insulating circuit 14 transforms the output (AC power) of the inverter 11 in accordance with a coil turn ratio, and transmits the transformed output to the inverter 12. The inverter 12 rectifies the AC power received from the insulating circuit 14, and outputs the rectified AC power to the inverter 13.

The inverter 13 converts the DC power received from the inverter 12 into AC power having a predetermined frequency, and outputs the AC power to the inlet 210.

As described above, the AC inverter 221 is configured to convert the DC power received from the battery 230 into AC power having a predetermined frequency, and output the AC power to the inlet 210. The circuit configuration illustrated in FIG. 5 is an example, and may be modified appropriately. Any circuit configuration may be selected from a known vehicle-mounted inverter. The vehicle-mounted inverter is disposed in the vehicle, and is configured to convert DC power from a vehicle-mounted driving battery into AC power, and supply the AC power to an electric apparatus. The AC inverter 221 may be configured to perform bidirectional power conversion between the battery 230 and the inlet 210, or may be configured to perform power conversion in only one direction (for example, the direction from the battery 230 to the inlet 210).

With reference to FIG. 4 again, the AC inverters 221A is provided with a monitoring unit 224A, and the AC inverters 221B is provided with a monitoring unit 224B. Each of the monitoring units 224A and 224B includes various sensors that detect a state (such as a voltage, a current, and a temperature) of each of the AC inverters 221A and 221B, and outputs the detection result to the ECU 250. The ECU 250 controls the AC inverters 221A and 221B based on the detection results output from the monitoring units 224A and 224B. Thus, the electric power output from each inverter to the inlet 210 (that is, the discharge power of the charge/discharge device 220) is adjusted. The ECU 250 may be configured to monitor a current of each of the AC inverters 221A and 221B, and perform a current limitation on the inverter whose current is likely to exceed a predetermined permissible current value (for example, 15 A). The details of a wiring between each inverter and the inlet 210 will be described later (see FIG. 7).

The ECU 250 can disconnect the AC inverters 221A and 221B from the inlet 210 by turning off the discharge relays 223A and 223B, respectively. In the present embodiment, a discharge relay is provided for each inverter. Therefore, it is possible to individually disconnect each inverter from the inlet 210. When the discharge relay is turned off, the discharge from the inverter corresponding to this discharge relay to the inlet 210 is prohibited. The number of discharge relays is arbitrary. The discharge relays may be arranged to collectively disconnect a plurality of inverters from the inlet.

Each of the AC inverters 221A and 221B may be configured to adjust the frequency of the AC power such that the AC power is output at a frequency set initially (for example, at the time of shipment). Alternatively, the ECU 250 may control the AC inverters 221A and 221B based on the location of the vehicle 200 such that AC power is output from each inverter at an appropriate frequency for each region. The ECU 250 may be configured to allow a user to set an arbitrary frequency.

A charge relay 223C is provided between the charger 222 and the battery 230 (more specifically, closer to the charger 222 than the SMR 231). The charge relay 223C is configured to switch the connection/disconnection of a charge path extending from the charger 222 to the battery 230. When the charge relay 223C is turned off, the supply of electric power from the inlet 210 to the battery 230 through the charger 222 is prohibited.

Figure 6:
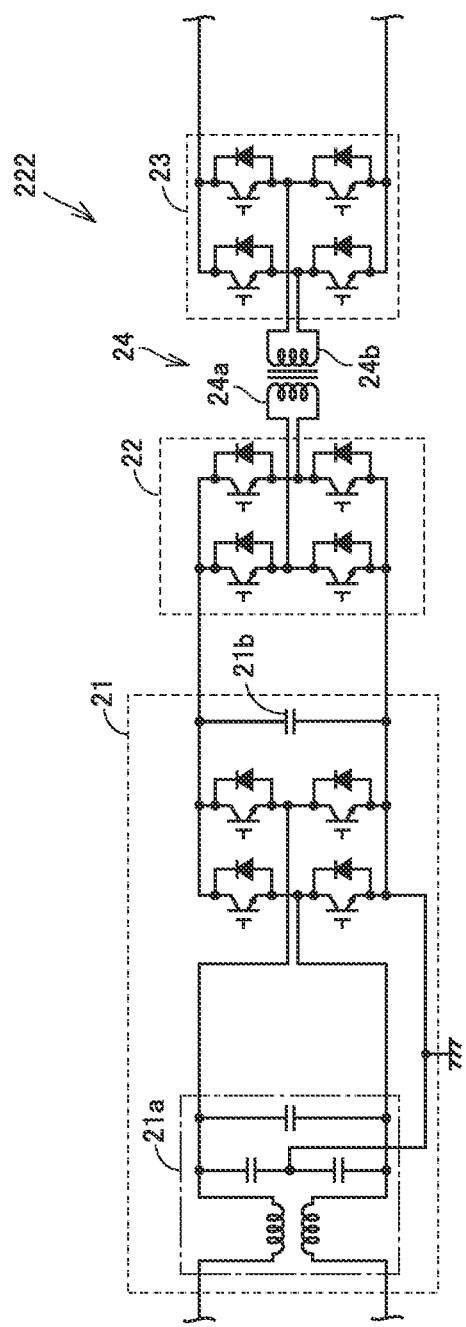
FIG. 6 is a diagram illustrating a circuit configuration example of a vehicle-mounted charger illustrated in FIG. 4.

FIG. 6 is a diagram illustrating a circuit configuration example of the charger 222. With reference to FIG. 6 as well as FIG. 4, the charger 222 includes inverters 21 to 23 and an insulating circuit 24. Each of the inverters 21-23 includes a full bridge circuit including four switching elements. Among the inverters 21 to 23, the inverter 21 located closest to the inlet 210 further includes a filter circuit 21a and a smoothing capacitor 21b. The filter circuit 21a removes high-frequency noise included in the AC power. Each switching element included in the inverters 21 to 23 is controlled by the ECU 250. The insulating circuit 24 is an insulation transformer that includes a first coil 24a and a second coil 24b.

The inverter 21 rectifies AC power received from the inlet 210, and outputs the rectified AC power to the inverter 22. The inverter 22 converts the DC power received from the inverter 21 into high-frequency AC power. The insulating circuit 24 transforms the output (AC power) of the inverter 22 in accordance with a coil turn ratio, and transmits the transformed output to the inverter 23. The inverter 23 rectifies the AC power received from the insulating circuit 24, and outputs the rectified AC power to the battery 230.

As described above, the charger 222 is configured to convert the AC power received from the inlet 210 into DC power, and output the DC power to the battery 230. The circuit configuration illustrated in FIG. 6 is an example, and may be modified appropriately. The charger 222 may be configured to perform bidirectional power conversion between the battery 230 and the inlet 210, or may be configured to perform power conversion in only one direction (for example, the direction from the inlet 210 to the battery 230). The charger 222 capable of performing bidirectional power conversion can be used as a power conversion circuit for discharging. Therefore, in the configuration in which the charger 222 is configured to perform bidirectional power conversion, either the AC inverter 221A or the AC inverter 221B may be omitted, and the charger 222 may be used instead.

With reference to FIG. 4 again, the charger 222 is provided with a monitoring unit 224C. The monitoring unit 224C includes various sensors that detect a state (for example, a voltage, a current, and a temperature) of the charger 222, and outputs the detection result to the ECU 250. The ECU 250 controls the charger 222 based on the detection result output from the monitoring unit 224C. Thus, the electric power output from the charger 222 to the battery 230 (that is, the charge power of the battery 230) is adjusted.

With reference to FIG. 1 again, the first end P51 of the discharge assembly 500 (the distal end of the discharge connector 511) includes a connector terminal on an end face F1. The end face F1 of the first end P51 corresponds to a surface (connection surface) connected to the inlet 210 of the vehicle 200. The connector terminals provided on the end face F1 include a terminal L1, a terminal L2, a terminal PE, a terminal CS, and a terminal CP.

The terminals L1 and L2 correspond to two terminals to which AC power is input from the vehicle 200. The terminal L1 is a HOT-side terminal, and the terminal L2 is a COLD-side terminal. Hereinafter, the terminal L1 will be also referred to as the "AC1", and the terminal L2 will be also referred to as the "AC2". The terminal PE corresponds to a ground terminal (hereinafter also referred to as the "GND"). The terminal CS corresponds to a terminal (hereinafter also referred to as the "PISW") for detection (proximity detection) of a connector state (connected state/fitted state/non-fitted state). The terminal CS outputs a potential signal indicating the connector state (hereinafter also referred to as the "PISW signal") to the vehicle 200. The terminal CP corresponds to a terminal for CPLT (hereinafter also referred to as the "CPLT").

The inlet 210 includes terminals corresponding to the above-mentioned terminals (the terminals L1, L2, PE, CS, and CP) of the discharge connector 511. Hereinafter, in order to clarify the correspondence relationship between the terminals of the discharge connector 511 and the terminals of the inlet 210, the terminals of the inlet 210 corresponding to the terminals L1, L2, PE, CS, and CP of the discharge connector 511 will be also referred to as the AC1, the AC2, the GND, the PISW, and the CPLT, respectively. In a state where the discharge connector 511 and the inlet 210 are fitted to each other, the AC1, the AC2, the GND, the PISW, and the CPLT of the discharge connector 511 are in contact with the AC1, the AC2, the GND, the PISW, and the CPLT of the inlet 210, respectively, and the terminals of the discharge connector 511 are electrically connected to the terminals of the inlet 210, respectively. The terminals of the discharge connector 511 and the structure for fitting into the inlet 210 may conform to, for example, Type 1 defined in the standard "IEC62196-2:2011".

Figure 7:
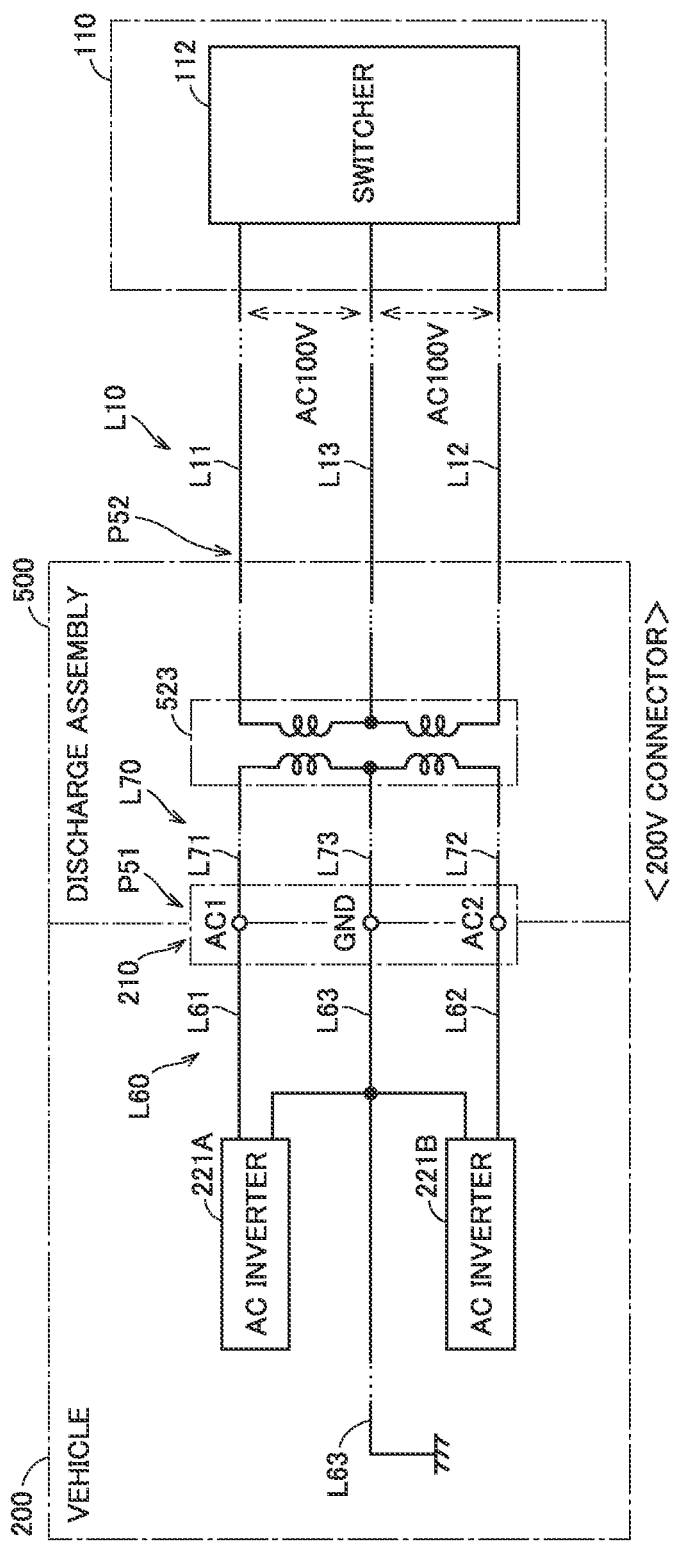
FIG. 7 is a diagram illustrating how the vehicle, the discharge assembly, and the distribution board are connected in a grid independent operation mode of the power supply system according to an embodiment of the present disclosure.

When the discharge connector 511 is connected to the inlet 210, the single-phase three-line wiring of the vehicle 200 is connected to the single-phase three-line wiring of the discharge assembly 500. FIG. 7 is a diagram illustrating how the vehicle 200, the discharge assembly 500, and the distribution board 110 are connected in the grid independent operation mode.

With reference to FIG. 7 as well as FIGS. 1 to 4, the vehicle 200 includes a single-phase three-line wiring L60 (that is, a voltage line L61, a voltage line L62, and a neutral line L63) connected to the AC1, the AC2, and the GND of the inlet 210. On the other hand, the discharge assembly 500 includes a single-phase three-line wiring L70 (that is, a voltage line L71, a voltage line L72, and a neutral line L73) connected to the AC1, the AC2, and the GND of the first end P51 (the distal end of the discharge connector 511 illustrated in FIG. 1). When the discharge connector 511 is connected to the inlet 210, the single-phase three-line wiring L60 of the vehicle 200 is connected to the single-phase three-line wiring L70 of the discharge assembly 500 through the AC1, the AC2, and the GND.

In the vehicle 200, the AC1 of the inlet 210 is connected to the AC inverter 221A through the voltage line L61, and the GND of the inlet 210 is connected to the AC inverter 221A through the neutral line L63. The AC2 of the inlet 210 is connected to the AC inverter 221B through the voltage line L62, and the GND of the inlet 210 is connected to the AC inverter 221B through the neutral line L63. The GND of the inlet 210 is grounded to the vehicle body of the vehicle 200 through the neutral line L63 (body earth). Single-phase AC power is supplied from the AC inverters 221A and 221B to the single-phase three-line wiring L60, and the single-phase AC power supplied to the single-phase three-line wiring L60 is transmitted to the single-phase three-line wiring L70 through the AC1, the AC2, and the GND.

In the discharge assembly 500, the single-phase three-line wiring L70 connects the first end P51 (the distal end of the discharge connector 511 illustrated in FIG. 1) and the converter 523 to each other. The converter 523 converts the single-phase three-line wiring L70 connected to the vehicle 200 into the single-phase three-line wiring L10 (indoor power path). The single-phase three-line wiring L70 and the single-phase three-line wiring L10 are insulated by the converter 523. However, the AC power supplied to the single-phase three-line wiring L70 is transmitted to the single-phase three-line wiring L10 through the converter 523. In the present embodiment, the converter 523 does not transform voltage. However, the present disclosure is not limited thereto, and the converter 523 may be configured to transform voltage. The converter 523 may include a filter circuit.

In the grid independent operation mode, the converter 523 is electrically connected to the switcher 112 of the distribution board 110 through the single-phase three-line wiring L10. Each of the AC inverters 221A and 221B is configured to receive the DC power supplied from the battery 230 (FIG. 4) and output the AC power to inlet 210. Between the AC1 and the GND in the inlet 210, a first AC power is output from the battery 230 through the AC inverter 221A. Between the AC2 and the GND in the inlet 210, a second AC power is output from the battery 230 through the AC inverter 221B. The first AC power and the second AC power are input to the first end P51 of the discharge assembly 500 from the inlet 210 connected to the first end P51. The first AC power and the second AC power are input from the inlet 210 to the first end P51 and transmitted to the converter 523 through the single-phase three-line wiring L70. The converter 523 transmits the first AC power and the second AC power to the single-phase three-line wiring L10 and transmits the first AC power and the second AC power to the second end P52 and further to the switcher 112 through the single-phase three-line wiring L10. In the grid independent operation mode according to the present embodiment, the first AC power applies a voltage of AC 100 V between the voltage line L11 and the neutral line L13, and the second AC power applies a voltage of AC 100 V between the voltage line L12 and the neutral line L13.

Figure 8:
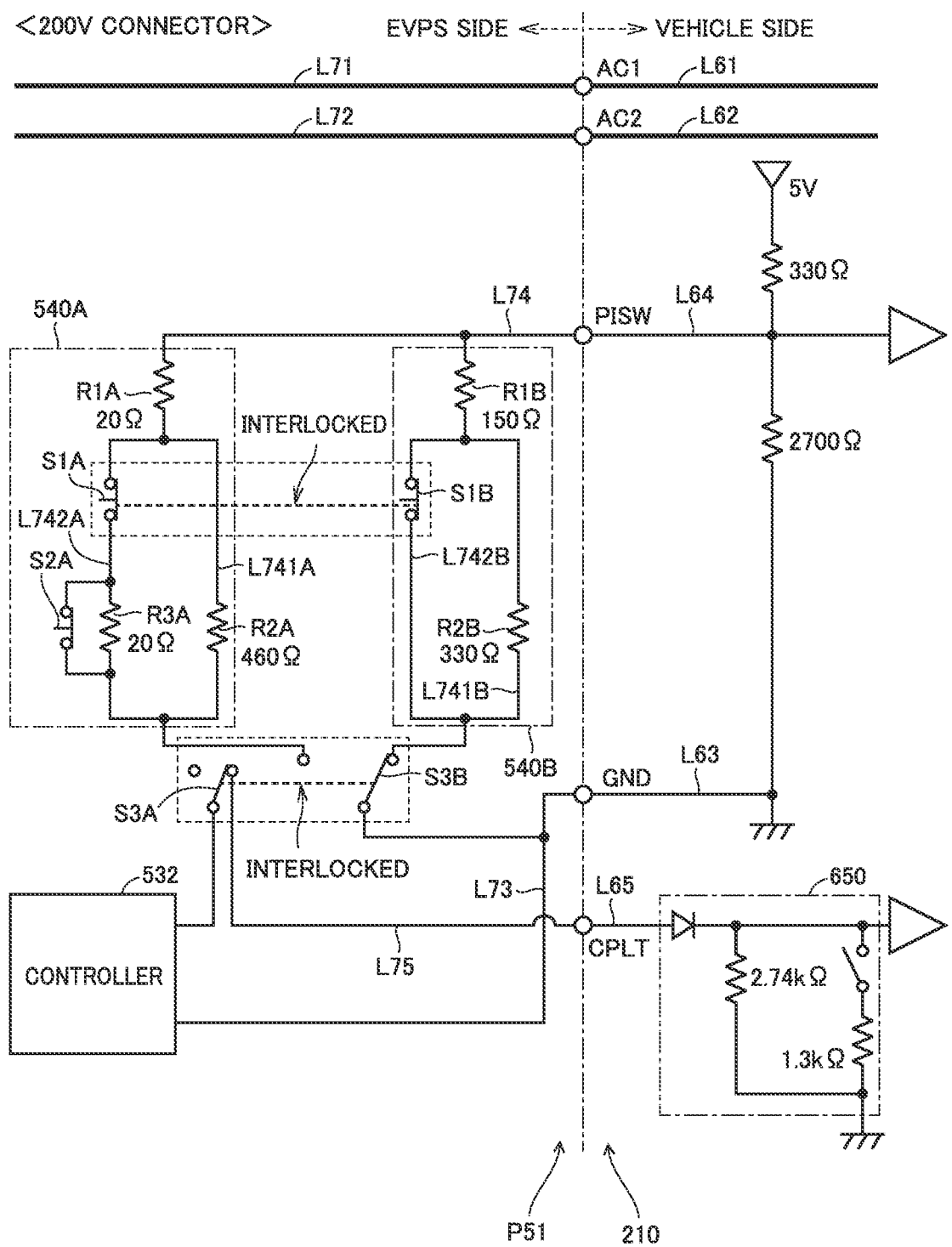
FIG. 8 is a schematic diagram illustrating a circuit configuration of a discharge assembly and a vehicle inlet illustrated in FIGS. 1 and 2.

FIG. 8 is a diagram illustrating a schematic circuit configuration of the discharge assembly 500 and the inlet 210. With reference to FIG. 8 as well as FIGS. 1 to 4, in the vehicle 200, a reference voltage is applied between the vehicle body (the ground) and a signal line L64, and the signal line L64 is connected to the PISW. The PISW signal (the PISW potential) is input to the ECU 250 through the signal line L64. When the first end P51 (the distal end of the discharge connector 511 illustrated in FIG. 1) is electrically connected to the inlet 210, a closed circuit (hereinafter, also referred to as a "PISW circuit") is formed such that the PISW and the GND are connected to each other through the intermediary of a circuit of the discharge assembly 500 (for example, a detection circuit 540A or 540B to be described later). Thus, the potential of the PISW changes. Even if the discharge assembly 500 does not include a power supply, a PISW signal is generated by the PISW circuit. The ECU 250 can determine the connector state based on the PISW signal (the PISW potential).

The discharge assembly 500 includes a detection circuit 540A, a detection circuit 540B, a switch S3A, and a switch S3B. The switch S3A is configured to switch the connection/disconnection between the controller 532 and the CPLT. The switch S3B is configured to switch between the detection circuit 540A and the detection circuit 540B. The detection circuit connected to the PISW circuit is switched by the switch S3B. The switches S3A and S3B are interlocked with the mode switcher 511c. The switches S3A and S3B are interlocked with each other and operate together.

When the grid independent operation mode is selected by the mode switcher 511c, the switch S3A disconnects the controller 532 from the CPLT, and the switch S3B connects the detection circuit 540A. Thus, the PISW and the GND are electrically connected to each other through the detection circuit 540A. On the other hand, when the normal mode is selected by the mode switcher 511c, the switch S3A connects the controller 532 to the CPLT, and the switch S3B connects the detection circuit 540B. Thus, the controller 532 and the CPLT are electrically connected to each other through the signal line L75, and the signal line L74 connected to the PISW is electrically connected to the neutral line L73 (GND) through the detection circuit 540B. In the vehicle 200, the CPLT is connected to the ECU 250 through a signal line L65. A CPLT circuit 650 is disposed on the signal line L65. The CPLT circuit 650 includes a switch controlled by the ECU 250. The ECU 250 can transmit a CPLT signal generated by the CPLT circuit 650 to the controller 532. By electrically connecting the controller 532 to the CPLT, it is possible to perform data communication (CPLT) between the controller 532 and the ECU 250.

The detection circuit 540A includes electric resistors R1A, R2A and R3A, and switches S1A and S2A. The signal line L74 extends from the PISW to the electric resistor R1A and branches at the electric resistor R1A into two branch lines L741A and L742A, and the branch paths L741A and L742A join together and are connected to the switch S3B. The electric resistor R2A is arranged on the branch line L741A, and the electric resistor R3A and the switch S1A are arranged on the branch line L742A. The electric resistor R2A and the electric resistor R3A are arranged in parallel. The electric resistor R3A and the switch S1A are arranged in series. The switch S2A is arranged in parallel to the electric resistor R3A.

The detection circuit 540B includes electric resistors R1B and R2B and a switch S1B. The signal line L74 extends from the PISW to the electric resistor R1B and branches at the electric resistor R1B into two branch paths L741B and L742B, and the branch paths L741B and L742B join together and are connected to the switch S3B. The electric resistor R2B is arranged on the branch line L741B, and the switch S1B is arranged on the branch line L742B.

Each of the switches S1A and S1B is opened and closed in conjunction with the latch release button 511a (FIG. 1) of the discharge assembly 500. Each of the switches S1A and S1B is in a closed state (conduction state) when the latch release button 511a is not pressed, and is in an open state (cut-off state) when the latch release button 511a is pressed. The switch S2A opens and closes in conjunction with the discharge start switch 511b (FIG. 1) of the discharge assembly 500. The switch S2A is in a closed state (conduction state) when the discharge start switch 511b is turned OFF, and is in an open state (cut-off state) when the discharge start switch 511b is turned ON. In the present embodiment, the discharge start switch 511b is turned ON while the user is pressing the discharge start switch 511b, and the discharge start switch 511b is turned OFF when the user releases the discharge start switch 511b. When the user does not operate either the latch release button 511a or the discharge start switch 511b, the switches S1A, S1B, and S2A are both in the closed state. Namely, each of the switches S1A, S1B, and S2A corresponds to a normally-on switch.

Each of the detection circuits 540A and 540B functions as a circuit for determining the operation mode of the power supply system. More specifically, the detection circuit 540A and the detection circuit 540B are different in resistance value (combined resistance). As illustrated in FIG. 8, in the detection circuit 540A, the electrical resistances R1A, R2A and R3A have resistance values of 20Ω, 460Ω and 20Ω, respectively. On the other hand, as illustrated in FIG. 8, the electric resistances R1B and R2B in the detection circuit 540B have resistance values of 150Ω and 330Ω, respectively. The potential of the PISW differs between a case where the detection circuit 540A is connected to the PISW circuit and a case where the detection circuit 540B is connected to the PISW circuit. Therefore, the ECU 250 can determine the operation mode (the grid independent operation mode or the normal mode) of the power supply system selected by the mode switcher 511c based on the PISW signal (the PISW potential). In the present embodiment, the resistance value of the detection circuit 540B connected in the normal mode is set the same as the resistance value in the charge connector defined in the standard "IEC61851-1:2010 Annex B". Since the same resistance value is used in the energy management mode, even if the charge/discharge is switched in the energy management mode, it is unnecessary for the user to perform a manual operation (for example, an operation to manually switch between the charge mode and the discharge mode), which makes it possible for the EVPS to automatically perform the energy management.

Each of the detection circuits 540A and 540B also functions as a circuit (proximity detection circuit) for determining whether the first end P51 (the distal end of the discharge connector 511 illustrated in FIG. 1) is in the connected state, the fitted state, or the non-fitted state. When the switches S1A, S1B, and S2A are in the open state, the resistance value (combined resistance) of the detection circuits 540A and 540B becomes larger than that when the switches S1A, S1B and S2A are in the closed state, which causes the potential of the PISW to rise. The ECU 250 can determine the state of each of the switches S1A, S1B and S2A (and in turn, the state of each of the latch release button 511a and the discharge start switch 511b) based on the PISW signal (the PISW potential).

In the discharge assembly 500, the latch release button 511a functions as a switch for stopping the discharge of electric power from the vehicle 200. In the grid independent operation mode, the discharge start switch 511b functions as a switch for starting the discharge of electric power from the vehicle 200.

In the grid independent operation mode, when the user performs a predetermined operation on the discharge start switch 511b while the connector state is in the connected state, the vehicle 200 (ECU 250) recognizes the start of discharge operation and starts the discharge of electric power. In the present embodiment, when the user turns on the discharge start switch 511b twice, the discharge operation is started. When the latch release button 511a is pressed during the discharge operation, the connector state enters the fitted state or the non-fitted state, whereby the vehicle 200 (ECU 250) recognizes the stop of discharge operation and stops the discharge of electric power.

Figure 9:
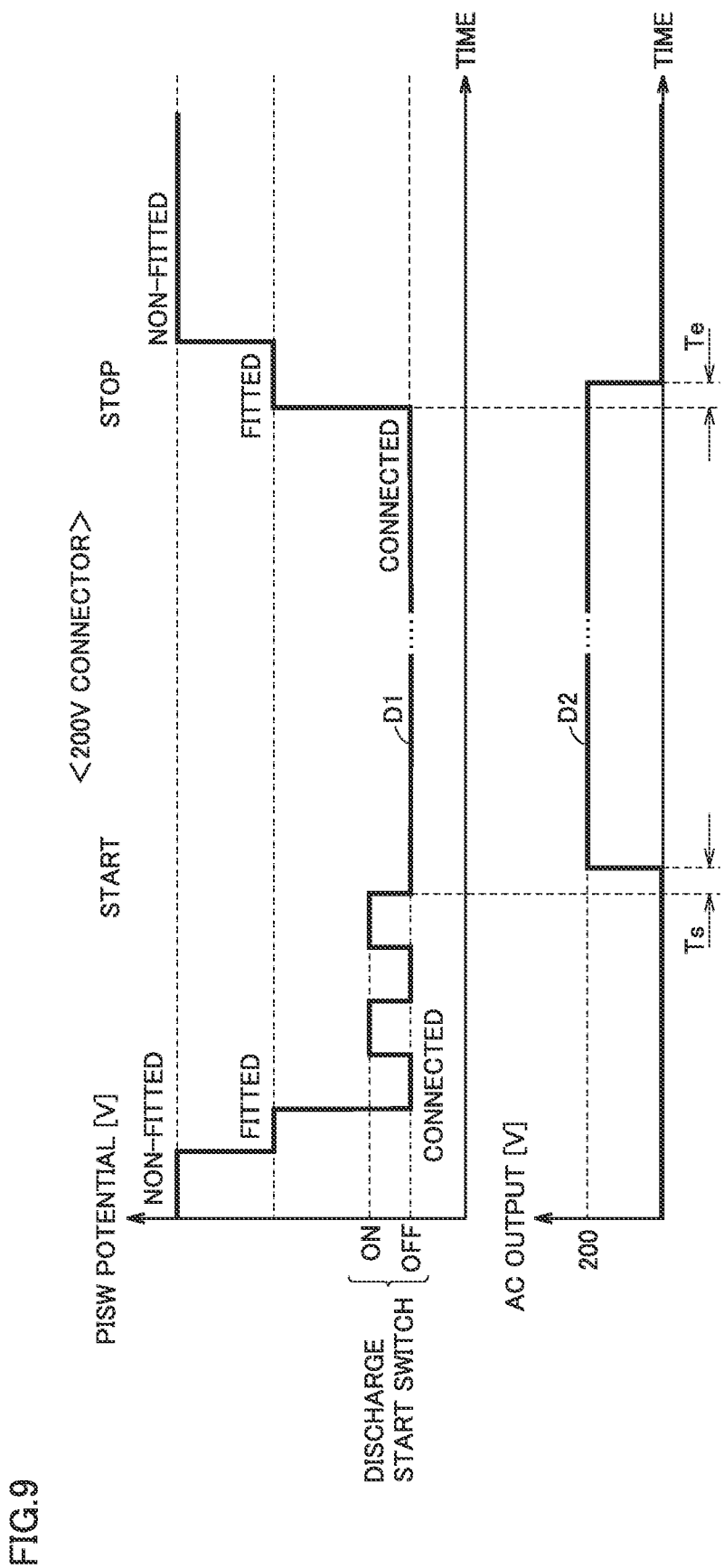
FIG. 9 is a time chart illustrating a sequence of start (start of discharge operation) and stop (stop of discharge operation) of the discharge assembly illustrated in FIGS. 1 and 2 in a grid independent operation mode.

FIG. 9 is a time chart illustrating a sequence of start (start of discharge operation) and stop (stop of discharge operation) of the discharge assembly 500 in the grid independent operation mode. In FIG. 9, a line D1 indicates the potential of the PISW, and a line D2 indicates the AC power output from the inlet 210 to the discharge assembly 500.

With reference to FIGS. 1 to 4 and FIG. 9, when the user inserts the discharge connector 511 into the inlet 210 while pressing the latch release button 511a, the connector state changes from the non-fitted state to the fitted state, whereby the potential of the PISW falls. Thereafter, when the user releases the latch release button 511a, the connector state changes from the fitted state to the connected state, whereby the potential of the PISW further falls. When a predetermined time (for example, 500 ms) has elapsed after the connector state enters the connected state, the operation of the discharge start switch 511b becomes effective. Then, when the user turns on the discharge start switch 511b, the potential of the PISW rises. Thereafter, when the user returns the discharge start switch 511b to the OFF state, the potential of the PISW returns. When the user operates the discharge start switch 511b in the order illustrated in FIG. 9, that is, in the order of ON, OFF, ON, and OFF while the connector state is in the connected state, the ECU 250 recognizes the start of discharge operation based on the potential of the PISW and starts the discharge of electric power. In order to suppress malfunction caused by noise, the recognition of the discharge start switch 511b by the ECU 250 becomes effective when the voltage corresponding to the ON/OFF operation continues for a predetermined time (such as 50 ms to 3000 ms).

The discharge operation of electric power from the vehicle 200 is performed by the ECU 250. Specifically, the ECU 250 controls the charge/discharge device 220 such that the first AC power and the second AC power described above are output from the inlet 210 to the discharge assembly 500. During the discharge operation, the SMR 231 (FIG. 4) is controlled to be in the closed state. A period Ts from the discharge start operation to the start of discharge operation can be set at an arbitrary length. The ECU 250 may perform a predetermined process (for example, a discharge pretest such as a disconnection check) during the period Ts. In the period Ts, the SMR 231 may be switched from the open state to the closed state.

When the latch release button 511a is pressed during the discharge operation, the connector state is switched from the connected state to the fitted state, whereby the potential of the PISW rises. When the connector state enters the fitted state, the ECU 250 recognizes the stop of discharge operation based on the potential of the PISW and stops the discharge of electric power. A period Te from the discharge stop operation to the stop of discharge operation may be a period defined in the standard "IEC61851-1".

With reference to FIG. 8 as well as FIGS. 1 to 4 again, the PISW signal (the PISW potential) also indicates the requested voltage value of the discharge connector electrically connected to the inlet 210 in addition to the connector state and the switch state described above. Specifically, the inlet 210 is configured to be connectable to a plurality of types of discharge connectors. In the present embodiment, in addition to the discharge assembly 500 described above, a discharge assembly 500A, which will be described below, may also be connected to the inlet 210. The discharge assembly 500 and the discharge assembly 500A are different in the requested voltage value. The requested voltage value of the discharge assembly 500 is 200 V, and the requested voltage value of the discharge assembly 500A is 100 V. Hereinafter, the discharge assembly 500 and the discharge assembly 500A are also referred to as the "200V connector" and the "100V connector", respectively.

Figure 10:
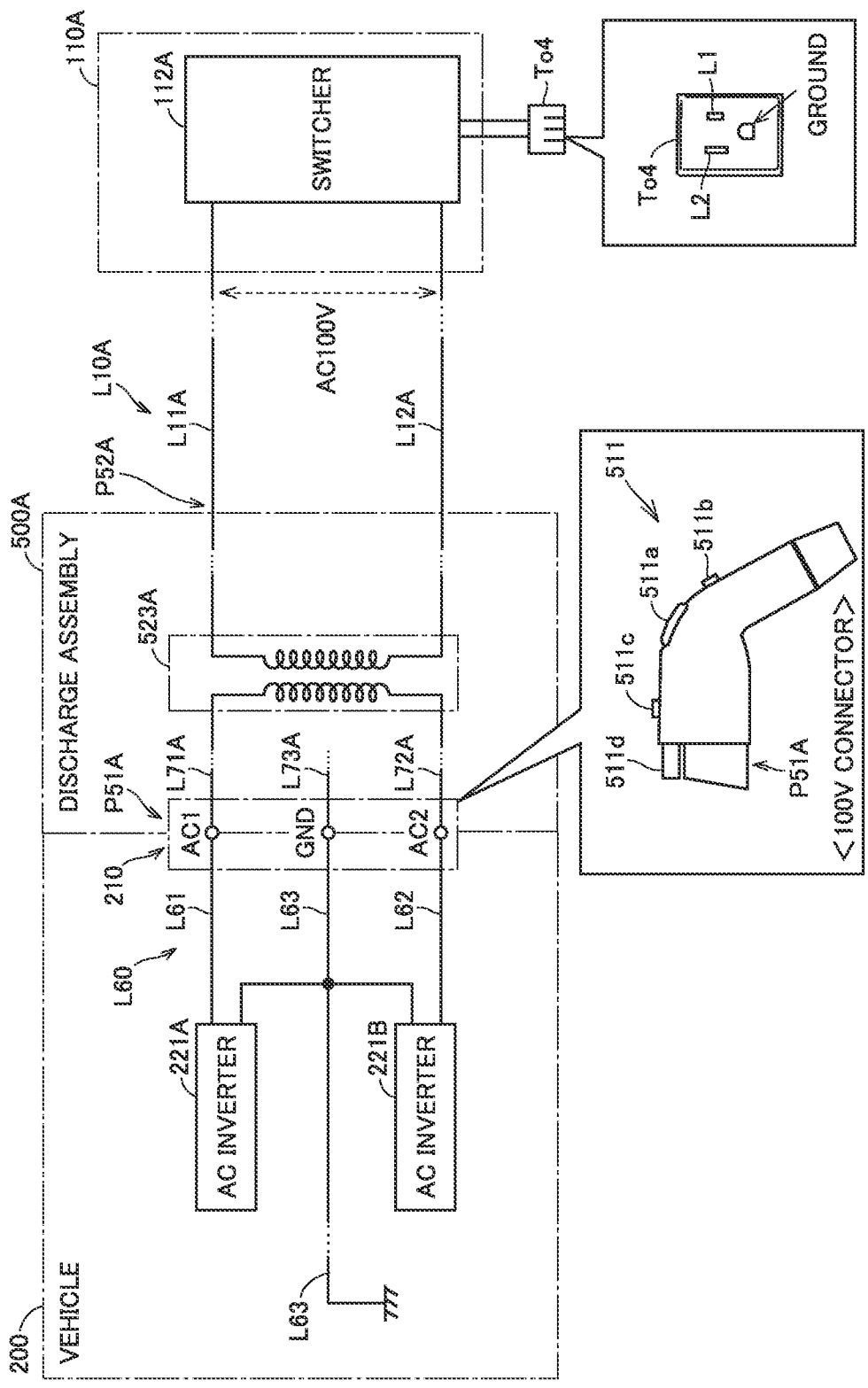
FIG. 10 is a diagram illustrating a 100V connector connectable to the vehicle inlet illustrated in FIG. 1.

FIG. 10 is a diagram illustrating the 100V connector. Hereinafter, the 100V connector will be described, focusing on the difference from the 200V connector.

With reference to FIG. 10, the discharge assembly 500A includes a discharge connector 511 (including a first end P51A) and a second end P52A. The AC1 and the AC2 of the first end P51A are connected to voltage lines L71A and L72A, respectively. The GND of the first end P51A is connected to a ground line L73A. When the discharge connector 511 of the discharge assembly 500A is connected to the inlet 210, the voltage lines L61 and L62 of the vehicle 200 are connected to the voltage lines L71A and L72A of the discharge assembly 500A, respectively. In the discharge assembly 500A, the voltage lines L71A and L72A connect discharge connector 511 and converter 523A to each other. The converter 523A converts the voltage lines L71A and L72A connected to the vehicle 200 into a single-phase two-line wiring L10A (indoor power path). The second end P52A of the discharge assembly 500A is connected to the distribution board 110A through a single-phase two-line wiring L10A.

In the grid independent operation mode, the converter 523A is electrically connected to the switcher 112A in the distribution board 110A through the single-phase two-line wiring L10A. Upon recognizing that the discharge assembly 500A is connected to the inlet 210, the ECU 250 controls the AC inverters 221A and 221B such that the single-phase AC power of 100 V is output between the voltage line L11A and the voltage line L12A. The single-phase AC power of 100 V is transmitted to the switcher 112A through the single-phase two-line wiring L10A. The switcher 112A outputs a single-phase AC power of 100 V to the single-phase two-line outlet To4 installed in the building 100. In the outlet To4, the outlet terminals electrically connected to the voltage line L11A and the voltage line L12A are denoted by "L1" and "L2", respectively. The outlet To4 includes L1, L2, and a ground terminal. The outlet To4 outputs the single-phase AC power of 100 V between L1 and L2.

Figure 11:
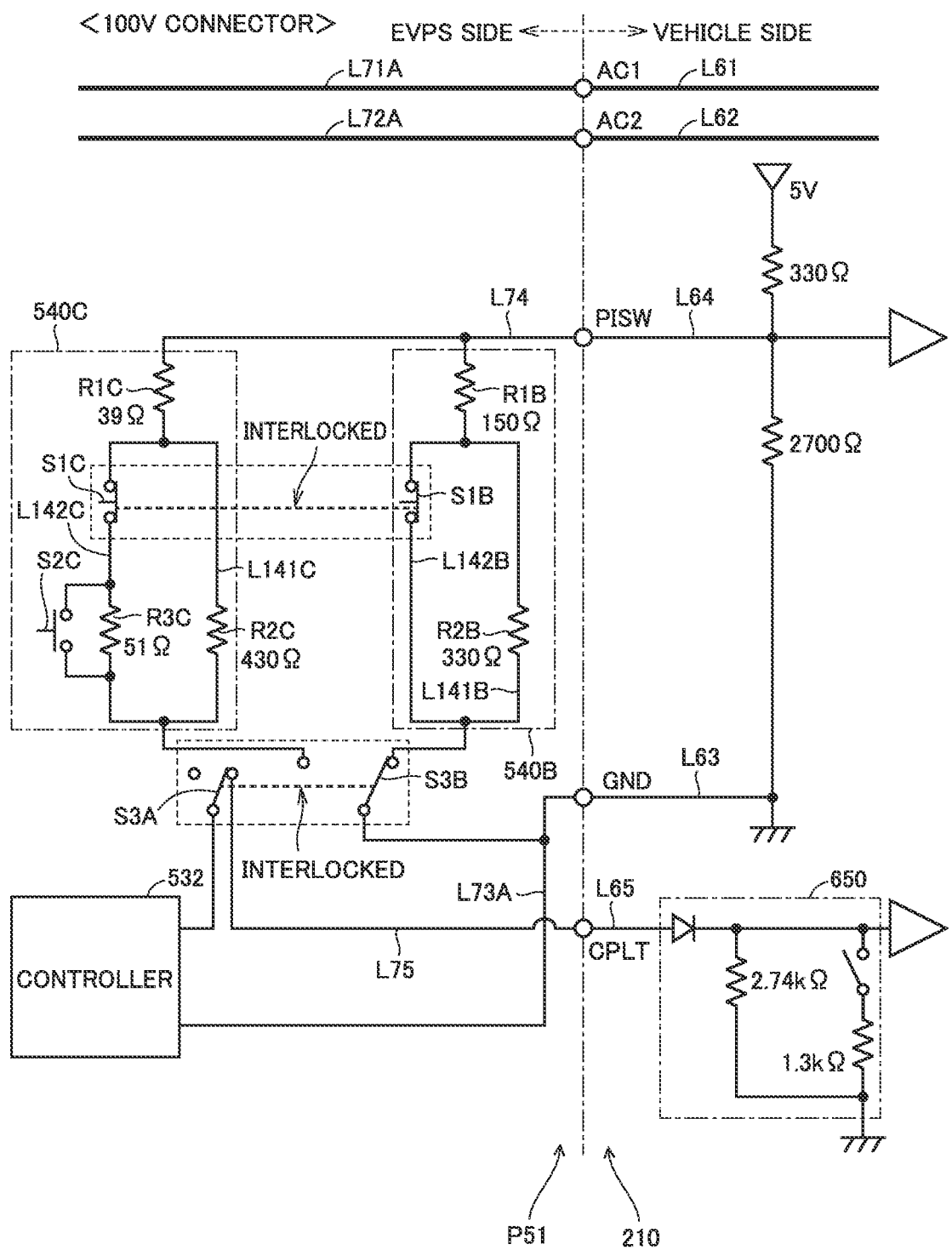
FIG. 11 is a schematic diagram illustrating a circuit configuration of the 100V connector illustrated in FIG. 10.

FIG. 11 is a diagram illustrating a schematic circuit configuration of the 100V connector. With reference to FIG. 11, the discharge assembly 500A includes a detection circuit 540C instead of the detection circuit 540A (FIG. 8). When the discharge assembly 500A is connected to the inlet 210 and the grid independent operation mode is selected by the mode switcher 511c, the detection circuit 540C is connected to the PISW circuit. The detection circuit 540C includes electric resistors R1C, R2C and R3C, and switches S1C and S2C. The switches S1C and S2C is opened and closed in conjunction with the latch release button 511a and the discharge start switch 511b, respectively. The detection circuit 540C basically has a configuration similar to that of the detection circuit 540A illustrated in FIG. 8, but differs from the detection circuit 540A in the following points.

The detection circuit 540A and the detection circuit 540C are different in resistance value. As illustrated in FIG. 11, the electrical resistances R1C, R2C, and R3C in the detection circuit 540C have resistance values of 39Ω, 430Ω, and 51Ω, respectively. Each resistance value in each of the detection circuits 540A and 540C is set in accordance with a potential map M2 to be described later. In addition, each of the electrical resistances included in the detection circuits 540A and 540C is set to a resistance value different from that of each electrical resistance in the charge connector defined in the standard "IEC61851-1:2010 Annex B". Thus, the ECU 250 can distinguish between the charge connector and the discharge connector based on the PISW signal (the PISW potential).

In the detection circuit 540C, the switch S1C is a normally-on switch, and the switch S2C is a normally-off switch. The switch S2C is in the closed state when the discharge start switch 511b is ON, and is in the open state when the discharge start switch 511b is OFF.

Figure 12:
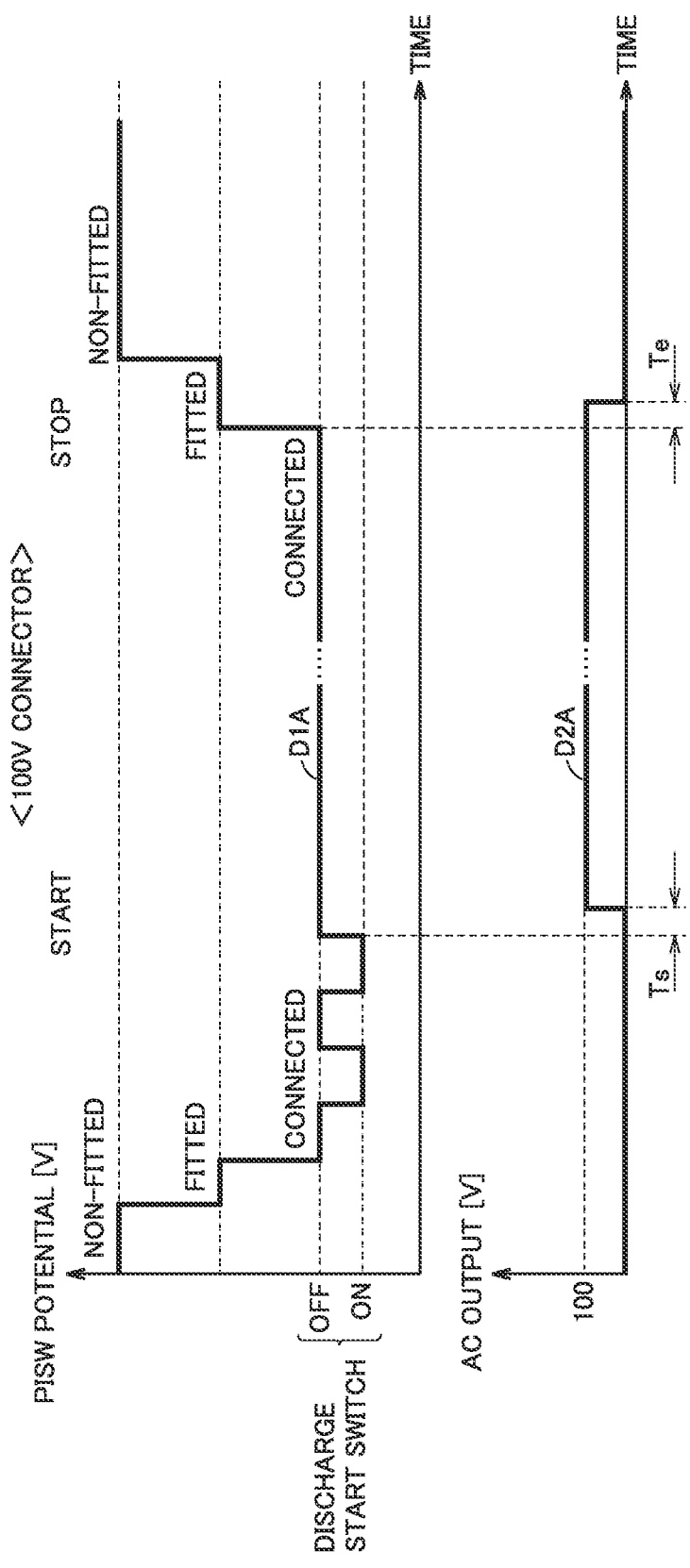
FIG. 12 is a time chart illustrating a sequence of start (start of discharge operation) and stop (stop of discharge operation) of the 100V connector illustrated in FIG. 10.

FIG. 12 is a time chart illustrating a sequence of start (start of discharge operation) and stop (stop of discharge operation) of the 100V connector. In FIG. 12, a line D1A indicates the potential of the PISW, and a line D2A indicates the AC power output from the inlet 210 to the discharge assembly 500A.

With reference to FIG. 12 as well as FIGS. 10 and 11, the sequence of the discharge assembly 500A is basically the same as the sequence of the discharge assembly 500 illustrated in FIG. 9. However, when the user turns on the discharge start switch 511b, the potential of the PISW falls. When the user returns the discharge start switch 511b to the OFF state, the potential of the PISW returns. When the user operates the discharge start switch 511b in the order illustrated in FIG. 12, that is, in the order of ON, OFF, ON, and OFF when the connector state is in the connected state, the ECU 250 recognizes the start of discharge operation based on the potential of the PISW and starts the discharge of electric power.

Figure 13:
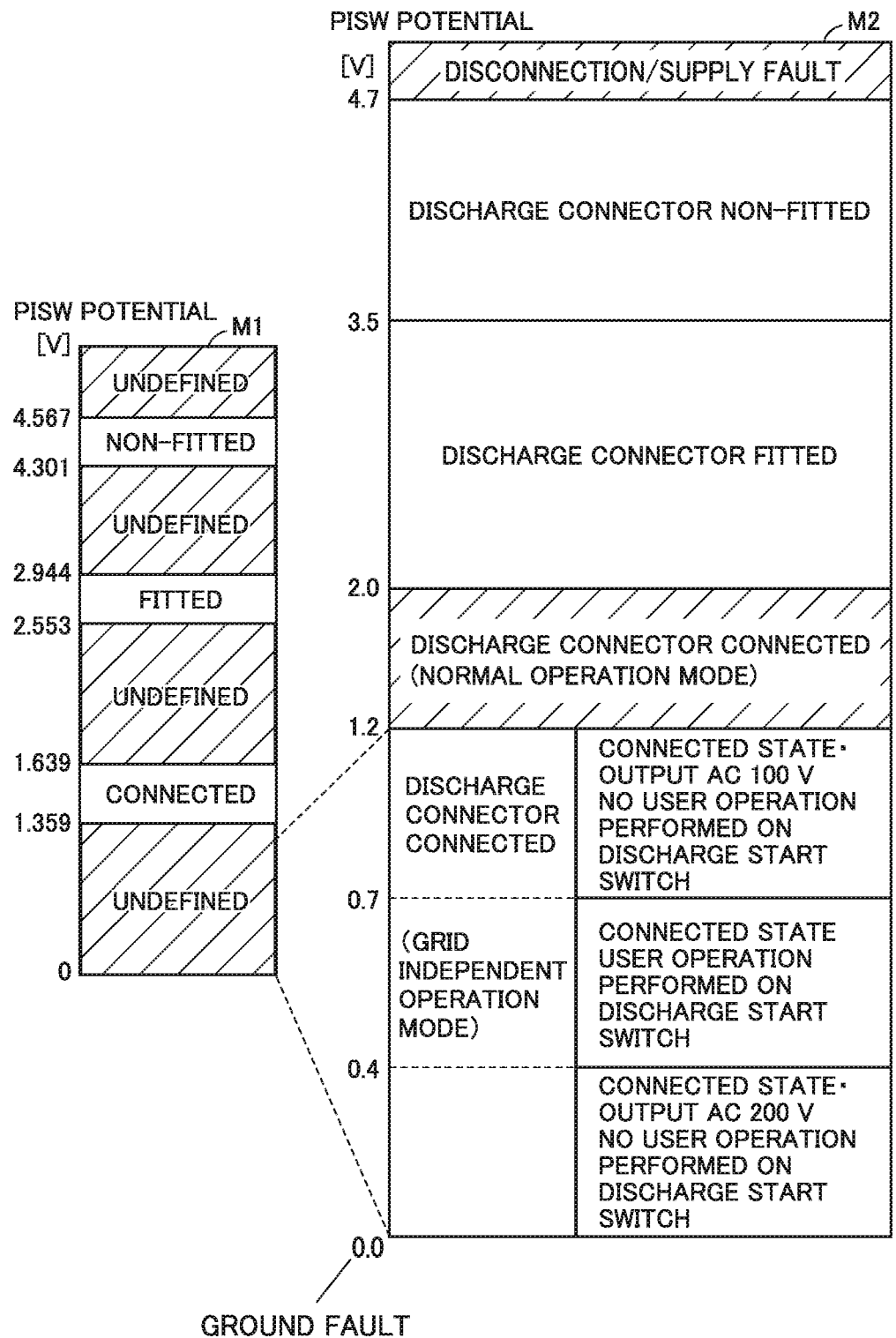
FIG. 13 is a diagram illustrating a PISW signal (connector signal)

FIG. 13 is a diagram illustrating the PISW signal (the PISW potential). With reference to FIG. 13, a potential map M1 about the PISW potential indicates a determination value for each potential range defined in the charging standard "IEC61851-1". In the range of 0 to 4.7 V, the connector states such as the connected state, the fitted state and the non-fitted state are defined as the determination values for the potential range of 1.359 to 1.639 V, the potential range of 2.553 to 2.944 V, and the potential range of 4.301 to 4.567 V, respectively. The potential ranges other than these are not defined.

The potential map M2 about the PISW potential is a control map used for control, and is stored in the storage device 253 of the ECU 250 illustrated in FIG. 4. In the potential map M2, the connector state, the switch state, the requested voltage value, and the operation mode of the power supply system are set for each potential range. When the discharge connector is electrically connected to the inlet 210, the ECU 250 use potential map M2 to obtain the connector state, the switch state, the requested voltage value, and the operation mode of the power supply system of the discharge connector based on the PISW signal. The ECU 250 can also determine whether or not the discharge connector is electrically connected to the inlet 210 based on the PISW signal.

In the potential map M2, a potential range indicating that the discharge connector is in the connected state (hereinafter, also referred to as a "first connected range") in the grid independent operation mode is assigned to the potential range of 0.0 to 1.2 V. A potential range indicating that the discharge connector is in the connected state (hereinafter, also referred to as a "second connected range") in the normal mode is assigned to the potential range of 1.2 to 2.0 V. Hereinafter, when there is no need to distinguish the first connected range and the second connected range, each of the first connected range and the second connected range may be referred to as the "connected range".

A potential range indicating that the discharge connector is in the fitted state (hereinafter also referred to as a "fitted range") is assigned to the potential range of 2.0 to 3.5 V. A potential range indicating that the discharge connector is in the non-fitted state (hereinafter, also referred to as a "non-fitted range") is assigned to the potential range of 3.5 to 4.7 V.

In the potential map M2, the first connected range is assigned to the potential range of 0.0 to 1.2 V that is not defined in the charging standard "IEC61851-1". Thus, it is easier for the ECU 250 to distinguish between the charge connector and the discharge connector. The first connected range is further divided into three potential ranges (0.0 to 0.4 V, 0.4 to 0.7 V, and 0.7 to 1.2 V) which will be described below.

A potential range indicating that the requested voltage value of the discharge connector connected to the inlet 210 is 200 V (hereinafter also referred to as the "200V range") is assigned to the potential range of 0.0 to 0.4 V. The fact that the PISW potential belongs to the 200V range means that the discharge connector connected to the inlet 210 is a 200V connector. A potential range indicating that the requested voltage value of the discharge connector connected to the inlet 210 is 100 V (hereinafter also referred to as the "100V range") is assigned to the potential range of 0.7 to 1.2 V. The fact that the PISW potential belongs to the 100V range means that the discharge connector connected to the inlet 210 is a 100V connector. Since the 100V connector (FIG. 11) and the 200V connector (FIG. 8) are different in resistance value, they are different in the PISW potential when each connector is connected to the inlet 210. Each of the 100V range and the 200V range indicates that the discharge start switch of the discharge connector is in the OFF state in addition to the requested voltage value of the discharge connector connected to the inlet 210.

A potential range indicating that the discharge start switch is in the ON state (hereinafter, also referred to as "discharge start range") is assigned to the potential range of 0.4 to 0.7 V. Since the switch S2A (FIG. 8) interlocked with the discharge start switch 511b is a normally-on switch in the 200V connector, when the discharge start switch 511b is switched from the OFF state to the ON state, the PISW potential rises. Since the switch S2C (FIG. 11) interlocked with the discharge start switch 511b is a normally-off switch in the 100V connector, when the discharge start switch 511b is switched from the OFF state to the ON state, the PISW potential falls.

Figure 14:
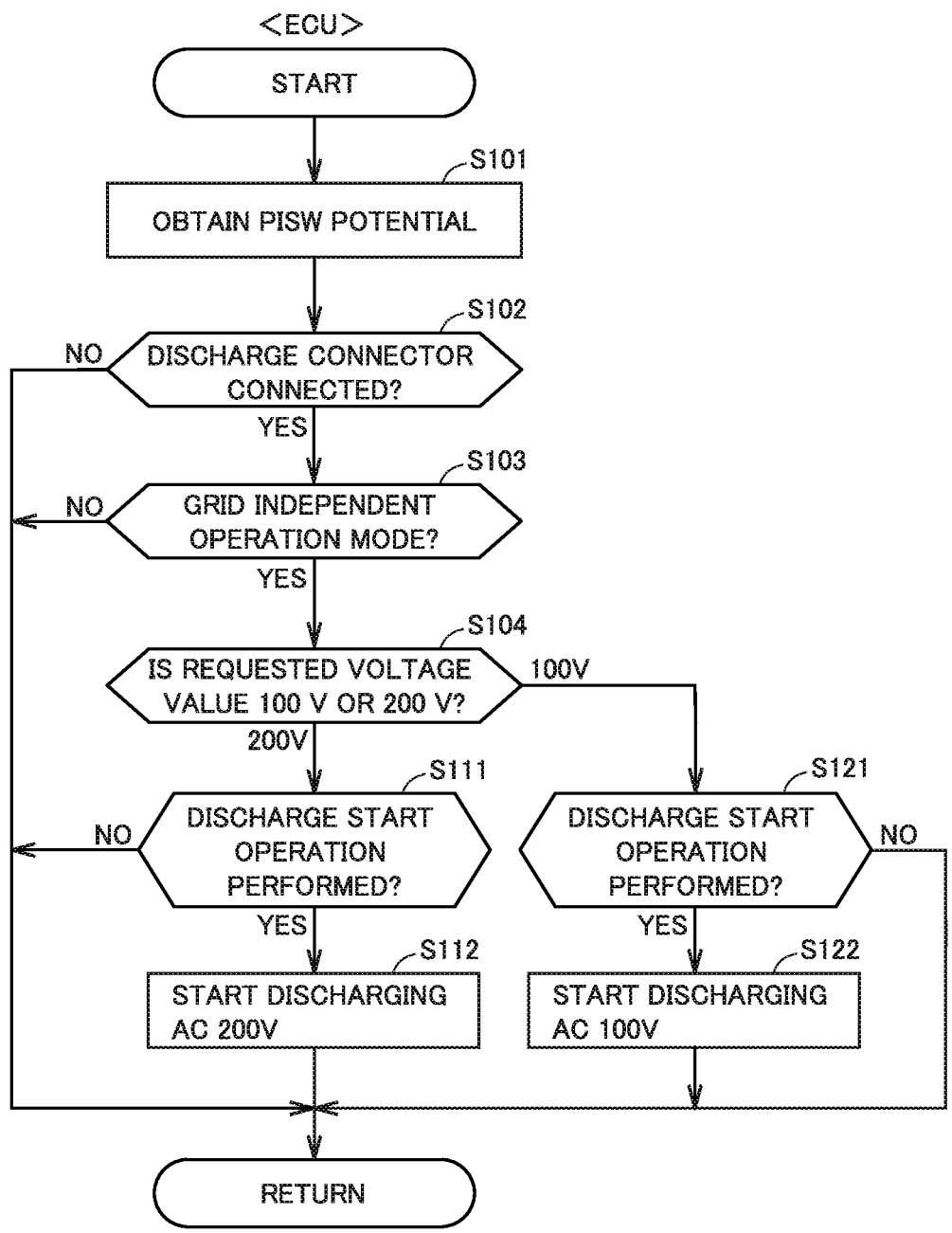
FIG. 14 is a flowchart illustrating a power supply method according to an embodiment of the present disclosure.

FIG. 14 is a flowchart illustrating a process related to the start of discharge operation in the grid independent operation mode which is performed by the ECU 250. The process illustrated in this flowchart is repeatedly performed during a halt of the vehicle 200 (except the charge operation and the discharge operation).

With reference to FIG. 14 as well with FIGS. 1 to 13, in S101, the ECU 250 obtains a PISW signal (PISW potential). Next, in S102, the ECU 250 determines whether or not the discharge connector is connected to the inlet 210 based on the PISW signal. When the connector state is in the connected state, the determination result is YES in S102, and the process proceeds to S103. In S103, the ECU 250 determines whether or not the operation mode of the power supply system is the grid independent operation mode. If the operation mode of the power supply system is the normal mode (NO in S103), the process returns to the first step (S101). If the determination result is NO in S102, the process returns to the first step (S101). In the normal mode, the charge/discharge control is executed not by the process illustrated in FIG. 14 but by the process mainly based on the energy management function of the EVPS.

If the operation mode of the power supply system is the grid independent operation mode (YES in S103), the process proceeds to S104. In S104, the ECU 250 determines whether the requested voltage value of the discharge connector connected to the inlet 210 is 100 V or 200 V. The user connects the first power path by using the switcher 112 (FIG. 2) before switching the grid independent operation mode. Therefore, in the grid independent operation mode, the electric power supplied from the vehicle 200 to the building 100 through the discharge assembly 500 (more specifically, through the single-phase three-line wiring L10) is output from the switcher 112 to the first outlet To1, the second outlet To2 and the third outlet To3 (FIG. 3).

The ECU 250 uses the potential map M2 illustrated in FIG. 13 to obtain the state (such as the connector state) of the inlet 210, the information (such as the switch state and the requested voltage value) about the discharge connector connected to the inlet 210, and the operation mode (the grid independent operation mode or the normal operation mode) of the power supply system based on the PISW signal obtained in S101. The ECU 250 can determine the connector state (non-fitted state, the fitted state or the connected state) based on whether the PISW potential belongs to the non-fitted range, the fitted range or the connected range. Further, the ECU 250 can determine whether or not the discharge start switch has been operated by the user based on whether or not the PISW potential belongs to the discharge start range. Furthermore, the ECU 250 can determine the requested voltage value (100 V or 200 V) of the discharge connector based on whether the PISW potential belongs to the 100V range or the 200V range. The fact that the PISW potential belongs to the range of 200V means that the discharge connector connected to the inlet 210 is a single-phase three-line connector (the 200V connector illustrated in FIG. 7). The ECU 250 can determine the operation mode (the grid independent operation mode or the normal mode) of the power supply system based on whether the PISW potential belongs to the first connected range or the second connected range.

If it is determined in S104 that the requested voltage value of the discharge connector is 200 V, the ECU 250 determines in S111 whether or not the AC 200V discharge start operation (the discharge start switch operation in the order of ON, OFF, ON, and OFF illustrated in FIG. 9) has been performed by the user. If it is determined that the AC 200V discharge start operation has been performed by the user (YES in S111), the ECU 250 outputs a single-phase AC power of 200 V from the inlet 210 to the 200V connector in S112.

Specifically, the ECU 250 controls the AC inverters 221A and 221B such that a single-phase AC power of 200V is output between the AC1 and the AC2 of the inlet 210 illustrated in FIG. 7. Thus, a single-phase AC voltage of 100 V or 200 V is applied to the single-phase three-line wiring L10 illustrated in FIG. 3. In the present embodiment, each of the AC inverters 221A and 221B applies an AC voltage (AC 100 V) corresponding to a half of the requested voltage value, thereby applying AC 200 V between the AC1 and the AC2. Thereby, the single-phase AC voltage is applied between the voltage line L11 (the first voltage line) and the neutral line L13 and between the voltage line L12 (the second voltage line) and the neutral line L13 illustrated in FIG. 3. Thus, the single-phase AC power of 200V, 100V and 100V are output to the first outlet To1, the second outlet To2 and the third outlet To3 installed in the building 100, respectively.

If it is determined in S104 that the requested voltage value of the discharge connector is 100 V, in S121, the ECU 250 determines whether or not the AC 100V discharge start operation (the discharge start switch operation in the order of ON, OFF, ON, and OFF illustrated in FIG. 12) has been performed by the user. If it is determined that the AC 100V discharge start operation has been performed by the user (YES in S121), the ECU 250 outputs the single-phase AC power of 100 V from the inlet 210 to the 100V connector in S122.

Specifically, the ECU 250 controls the AC inverters 221A and 221B such that the single-phase AC power of 100 V is output between the AC1 and the AC2 of the inlet 210 illustrated in FIG. 10. In the present embodiment, the ECU 250 is configured in such a manner that only the AC inverter 221A is controlled to apply AC 100 V between the AC1 and the AC2, and the AC inverter 221B is controlled to be in a state of not applying any voltage (the conduction state). Thus, the single-phase AC power of 100 V is output to the outlet To4 installed in the building 100. However, the present disclosure is not limited thereto, and each of the AC inverters 221A and 221B may be configured to apply an AC voltage (AC 50 V) corresponding to a half of the requested voltage value, thereby applying AC 200 V between the AC1 and the AC2.

When the discharge operation is started in S112 or S122, a series of processes illustrated in FIG. 14 ends. The discharge operation ends when a predetermined discharge stop condition is satisfied. When the predetermined discharge stop condition is satisfied, the ECU 250 controls the AC inverters 221A and 221B to stop the discharge of electric power from the inlet 210 to the discharge connector. As described above, the discharge stop condition is satisfied when the connector state is in the fitted state or the non-fitted state during the discharge operation. The discharge stop condition is also satisfied when the SOC of the battery 230 becomes equal to or smaller than a predetermined SOC value. However, the present disclosure is not limited thereto, and the discharge stop condition can be arbitrarily set.

As described above, the power supply method according to the present embodiment includes: determining whether the operation mode of the power supply system is the grid independent operation mode (the first operation mode) in which the AC power is supplied from the vehicle 200 to the building 100 or the normal operation mode (the second operation mode) in which the AC power is supplied from the power grid PG to the building 100 (S103); determining whether or not the discharge assembly 500 is connected to the inlet 210 provided in the vehicle 200 (S102 and S104); when it is determined that the operation mode of the power supply system is the first operation mode (Yes in both S102 and S103, and when the requested voltage value is "200 V" in S104) and the discharge assembly 500 is connected to the inlet 210, supplying the electric power from the vehicle 200 to the discharge assembly 500 and supplying the single-phase AC power from the discharge assembly 500 to the building 200 through the single-phase three-line wiring L10.

In the above embodiment, the switcher 112 is operated by the user. However, the present disclosure is not limited thereto, and the switcher 112 may switch the power path based on its own judgement without depending on an instruction from the user. For example, the switcher 112 may be configured to maintain the second power path (that is, a power path for transferring the electric power supplied from the power grid PG to the building 100) in the connected state while the electric power is being supplied from the power grid PG to the distribution board 110, disconnect the second power path and connect the first power path (that is, a power path for transferring the electric power supplied from the discharge assembly 500 to the building 100) when no electric power is supplied from the power grid PG to the distribution board 110. Specifically, the switcher 112 may include a control circuit and an actuator configured to switch the power path. The control circuit of the switcher 112 may control the actuator by performing a process illustrated in FIG. 15, which will be described below.

Figure 15:
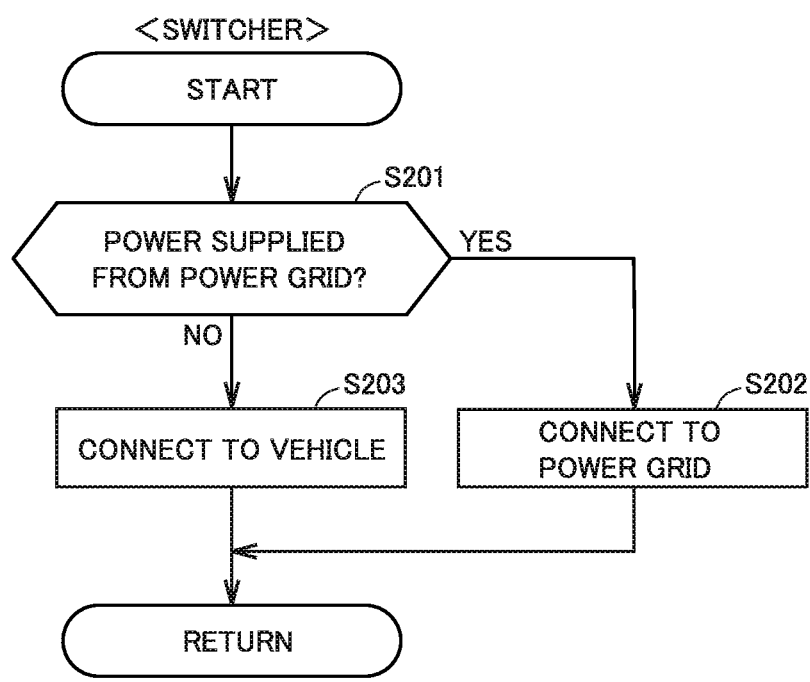
FIG. 15 is a flowchart illustrating a process performed by a switcher according to a modification.

FIG. 15 is a flowchart illustrating a process performed by the switcher 112 according to a modification. With reference to FIG. 15, in S201, the switcher 112 determines whether or not electric power is being supplied from the power grid PG to the distribution board 110. For example, a power sensor (such as a current sensor or a voltage sensor) may be installed in the main distribution board 111 or the single-phase three-line wiring L40A illustrated in FIG. 2. The switcher 112 may determine whether or not electric power is being supplied from the power grid PG to the distribution board 110 based on the output of the power sensor.

If it is determined that the electric power is being supplied from the power grid PG to the distribution board 110 (YES in S201), the switcher 112 connects the second power path in S202. Thus, the electric power supplied from the power grid PG to the building 100 (more specifically, through the single-phase three-line wiring L40A) is output from the switcher 112 to the first outlet To1, the second outlet To2 and the third outlet To3 (FIG. 3). On the other hand, it is determined that the electric power is not supplied from the power grid PG to the distribution board 110 (NO in S201), the switcher 112 connects the first power path in S203. Thus, the electric power supplied from the vehicle 200 to the building 100 through the discharge assembly 500 and the single-phase three-line wiring L10 is output from the switcher 112 to the first outlet To1, the second outlet To2 and the third outlet To3 (FIG. 3). The switching of the power path (S202 and S203) is performed by the actuator controlled by the control circuit. The switcher 112 may be configured to monitor whether or not electric power is supplied from the power grid PG to the distribution board 110 by repeatedly performing the process illustrated in FIG. 15 at a predetermined cycle.

The control map used to distinguish the discharge connector is not limited to the potential map M2 illustrated in FIG. 13. For example, the ECU 250 may detect the requested voltage value of the discharge connector by using a potential range other than the potential range of 0.0 to 1.2 V. More specifically, the connected range including the 100V range, the 200V range, and the discharge start range may be assigned to any one of the potential range of 1.639 to 2.553 V, the potential range of 2.944 to 4.301 V, and the potential range of 4.567 to 4.700 V, which are not defined in the charging standard "IEC61851-1".

Figure 16:
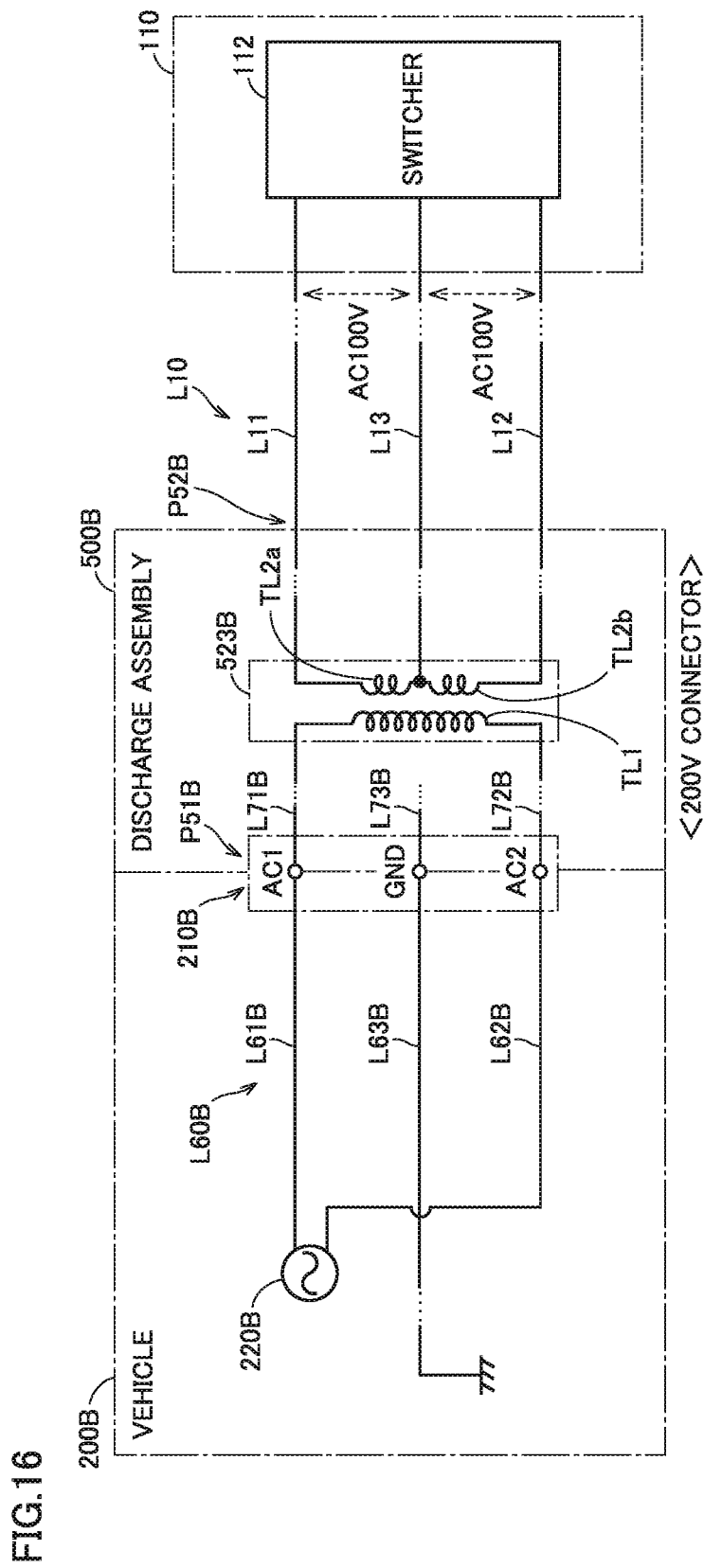
FIG. 16 is a diagram illustrating a modification of the configuration illustrated in FIG. 7.

In the above embodiment, the first end P51 and the second end P52 of the discharge assembly 500 is connected to each other by a single-phase three-line wiring (more specifically, the single-phase three-line wirings L10 and L70) (see FIG. 7). In the discharge assembly 500 illustrated in FIG. 7, there is no single-phase two-line wiring between the first end P51 and the second end P52. However, the present disclosure is not limited thereto, and the converter provided in the discharge assembly may be configured to convert a single-phase two-line wiring into a single-phase three-line wiring. FIG. 16 is a diagram illustrating a modification of the circuit configuration illustrated in FIG. 7.

With reference to FIG. 16, a vehicle 200B includes an inlet 210B and an AC power supply 220B. An AC power supply 220B is configured to apply an AC voltage between the AC1 and the AC2 of the inlet 210B. The AC power supply 220B is electrically connected to the AC1 and the AC2 of the inlet 210B through voltage lines L61B and L62B. The GND of the inlet 210B is grounded to the vehicle body of the vehicle 200B through a ground line L63B (body earth). The AC power supply 220B includes a vehicle-mounted battery (such as the battery 230 illustrated in FIG. 2) and a power conversion circuit. The power conversion circuit of the AC power supply 220B may be a vehicle-mounted charger (such as the charger 222 illustrated in FIG. 6) configured to perform bidirectional power conversion, or may be a vehicle-mounted inverter (such as the AC inverter 221 illustrated in FIG. 5).

The discharge assembly 500B includes a converter 523B. The converter 523B corresponds to an indoor power path converter. The first end P51B of the discharge assembly 500B and the converter 523B are connected to each other by a single-phase two-line wiring (including two lines, i.e., the voltage lines L71B and L72B). The converter 523B and the second end P52B of the discharge assembly 500B are connected to each other by a single-phase three-line wiring (including three lines, i.e., the voltage line L11, the voltage line L12 and the neutral line L13). The converter 523B is configured to convert the single-phase two-line wiring into the single-phase three-line wiring.

In the example illustrated in FIG. 16, the converter 523B is an insulation transformer including a primary coil TL1, a secondary coil TL2a, and a secondary coil TL2b. The primary side (the first end P51B side) of the converter 523B is connected to a single-phase two-line wiring (the voltage lines L71B and L72B). The AC1 and the AC2 of the first end P51B are connected to the voltage lines L71B and L72B, respectively. The GND of the first end P51B is connected to the ground line L73B. The primary coil TL1 is connected between the voltage lines L71B and L72B. The secondary side (the second end P52B side) of the converter 523B is connected to the single-phase three-line wiring L10 (the voltage line L11, the voltage line L12 and the neutral line L13). The single-phase three-line wiring L10 is connected between the converter 523B and the switcher 112 through the second end P52B of the discharge assembly 500B. The secondary coil TL2a is connected between the voltage line L11 and the neutral line L13. The secondary coil TL2b is connected between the voltage line L12 and the neutral line L13. In the converter 523B, for example, an AC voltage corresponding to a half of the voltage applied from the inlet 210B to the primary coil TL1 is transmitted to each of the secondary coils TL2a and TL2b. In the example illustrated in FIG. 16, AC 200V is applied to the primary coil TL1, and AC 100V is applied to each of the secondary coils TL2a and TL2b.

The power supply system according to the above-mentioned embodiment is configured to perform V2H of categories 2 and 4. However, the present disclosure is not limited thereto, and the power supply system may be configured to perform V2H of categories 2 and 3. Alternatively, the power supply system may be configured to perform V2H of only one category of 1 to 4.

Figure 17:
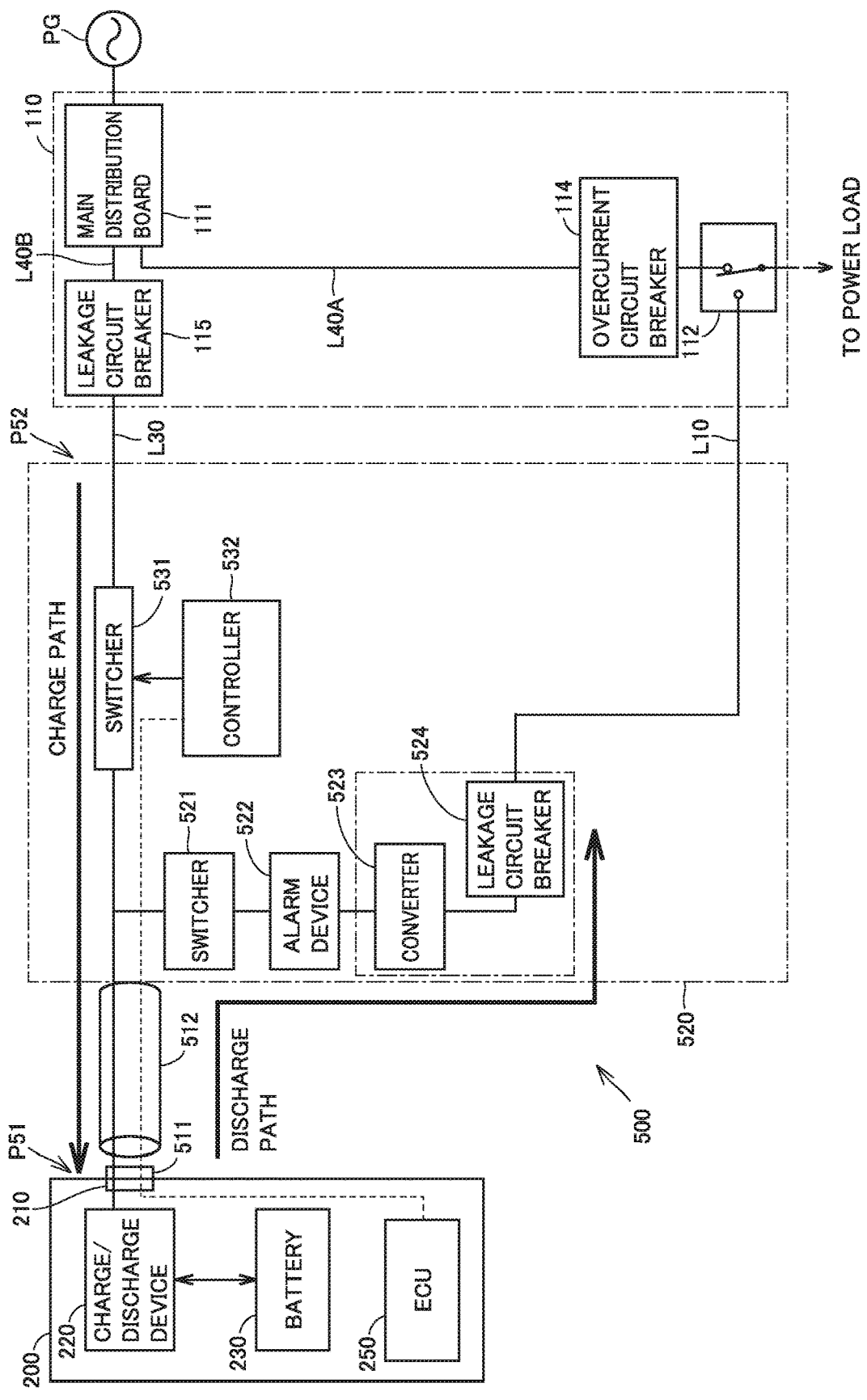
FIG. 17 is a diagram illustrating a modification of the power supply system illustrated in FIG. 2.

FIG. 17 is a diagram illustrating a modification of the circuit configuration of the power supply system illustrated in FIG. 2. With reference to FIG. 17, in the present modification, the second discharge path is omitted, and the power supply system is configured to perform V2H of category 2 only.

In the above embodiment, the second end of the discharge assembly is connected to the indoor distribution board through a single-phase three-line wiring. However, the present disclosure is not limited thereto, and the second end of the discharge assembly may be directly connected to the dedicated grid-independent indoor outlet through a single-phase three-line wiring. In the grid independent operation mode, the vehicle may supply electric power to the dedicated grid-independent indoor outlet through the discharge assembly.

Figure 18:
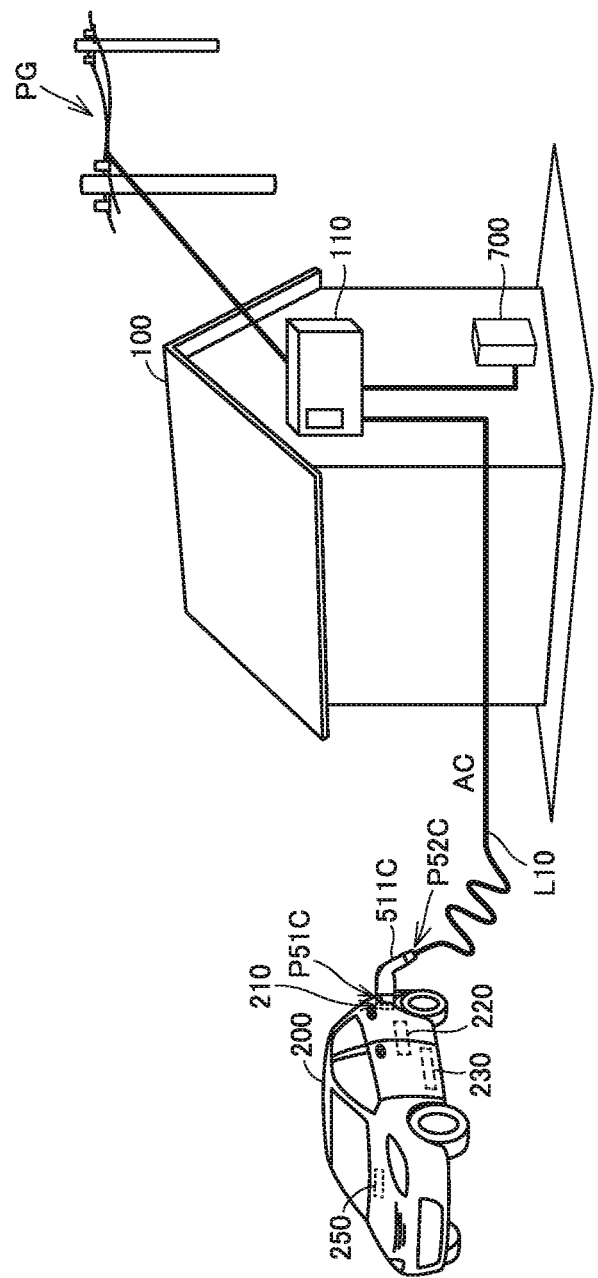
FIG. 18 is a view illustrating a modification of the discharge assembly illustrated in FIG. 1.

The discharge connector alone may function as a discharge assembly. FIG. 18 is a view illustrating a modification of the discharge assembly illustrated in FIG. 1. With reference to FIG. 18, in the present modification, a discharge connector 511C includes a first end P51C and a second end P52C. The discharge connector 511C is provided with a circuit similar to that built in the EVPS box 520 illustrated in FIG. 2, and functions as a discharge assembly. However, some of the functions illustrated in FIG. 2 may be omitted so as to simplify the circuit. The second end P52C of the discharge connector 511C is connected to the building 100 (more specifically, the distribution board 110 disposed in the building) through a single-phase three-line wiring L10.

The configuration of the discharge connector is not limited to the configuration illustrated in FIG. 1. For example, the discharge start switch 511b can be omitted. A trigger to start the discharge operation can be arbitrarily set. For example, the discharge operation may be started when a predetermined time has elapsed since the connector state entered the connected state. Alternatively, the discharge operation may be started when the user operates a switch provided in the vehicle.

The embodiment mentioned above provides an example in which AC 100 V/AC 200 V is output by the single-phase three-line wiring, but the voltage output by the single-phase three-line wiring may be modified appropriately. For example, AC 110 V/AC 220 V, AC 115 V/AC 230 V, or AC 120 V/AC 240 V may be output by the single-phase three-line wiring.

In the embodiment mentioned above, the discharge connector capable of providing two types of voltages (100 V/200 V) is connected to the inlet of the vehicle. However, it is also possible to connect a discharge connector capable of providing three or more types of voltages to the inlet of the vehicle. In addition, in the embodiment mentioned above, the AC power is output from the vehicle inlet to the discharge connector. However, the present disclosure is not limited thereto, and DC power may be supplied from the vehicle inlet to the discharge connector, a DC/AC conversion may be performed in the discharge connector. In the embodiment and each modification mentioned above, the vehicle is not limited to the BEV, it may be another xEV (for example, PHEV or FCEV).

In the embodiment mentioned above, the power supply system is configured to operate in two operation modes (a normal mode and a grid independent operation mode). However, the present disclosure is not limited thereto, and the power supply system may be configured to operate in three or more operation modes. The building configured to receive electric power from the power supply system is not limited to a house, it may be any building other than a house, and for example, it may be a factory, a school, a hospital, or a commercial facility.

The above-described modifications may be implemented in any combination.

Although the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power supply system that supplies AC power to a building, the power supply system comprising:
   a discharge assembly which is connectable to a discharge port provided in a vehicle, the discharge assembly including:
      a first end which receives electric power from the discharge port connected thereto; and
      a second end which outputs AC power; and
   a mode switcher which is configured to selectively switch between a first discharge path for a first operation mode and a second discharge path for a second operation mode via a first switcher, the second operation mode comprising a grid independent operation mode,
   the second end of the discharge assembly and the building being connected to each other by a single-phase three-line wiring.

2. The power supply system according to claim 1, wherein
the power supply system further includes a second switcher which connects one of a first power path and a second power path and disconnects the other, the first power path being a path for transferring electric power supplied from the discharge assembly to the building, the second power path being a path for transferring electric power supplied from a power grid to the building.

3. The power supply system according to claim 2, wherein
the building includes a distribution board,
the second switcher maintains the second power path in a connected state while electric power is being supplied from the power grid to the distribution board, and
the second switcher disconnects the second power path and connects the first power path when no electric power is supplied from the power grid to the distribution board.

4. The power supply system according to claim 2, wherein
the building includes a first outlet and a second outlet to which a single-phase AC power is input from the second switcher,
the first outlet outputs a single-phase AC power having a voltage of 95 V or more and 150 V or less, and
the second outlet outputs a single-phase AC power having a voltage of 190 V or more and 300 V or less.

5. The power supply system according to claim 1, wherein
the single-phase three-line wiring includes a first voltage line, a second voltage line, and a neutral line, and
the vehicle applies a single-phase AC voltage between the first voltage line and the neutral line and between the second voltage line and the neutral line.

6. The power supply system according to claim 1, wherein
the discharge assembly further includes a converter which converts a single-phase two-line wiring into a single-phase three-line wiring,
the first end of the discharge assembly and the converter are connected to each other by the single-phase two-line wiring, and
the converter and the second end of the discharge assembly are connected to each other by the single-phase three-line wiring.

7. The power supply system according to claim 1, wherein
the first end and the second end of the discharge assembly are connected to each other by a single-phase three-line wiring.

8. The power supply system according to claim 1, wherein
the discharge assembly is a discharge connector having the first end and the second end.

9. The power supply system according to claim 1, wherein
the discharge assembly further includes a discharge connector, a housing which houses a circuit electrically connected to the discharge connector, and a cable which connects the discharge connector and the housing to each other,
the discharge connector has the first end, and
the housing has the second end.

10. The power supply system according to claim 1, wherein
the first end includes a detection terminal which outputs to the vehicle side a connector signal indicating a requested voltage value of the discharge assembly.

11. The power supply system according to claim 10, wherein
the connector signal is a potential signal indicating a state of the discharge assembly and the discharge port in addition to the requested voltage value, and
the discharge assembly further includes a detection circuit that changes a potential of the detection terminal in response to the state of the discharge assembly and the discharge port.

12. The power supply system according to claim 1, wherein the discharge assembly further comprises:
a discharge connector, and
at least one latch that is configured to release the discharge connector and cause detection of a connected state, a fitted stated, or a non-fitted state relative to the discharge connector and the discharge port of the vehicle.

13. The power supply method according to claim 12, further comprising:
releasing, by at least one latch of the discharge assembly, a discharge connector of the discharge assembly and causing detection of a connected state, a fitted state, or a non-fitted state relative to the discharge connector and the discharge port of the vehicle.

14. A power supply method comprising:
determining whether an operation mode of a power supply system configured to supply AC power to a building is a first operation mode or a second operation mode, the first operation mode being an operation mode in which AC power is supplied from a vehicle to the building, the second operation mode being an operation mode in which AC power is supplied from a power grid to the building;
determining whether a discharge assembly is connected to a discharge port provided in the vehicle;
supplying electric power from the vehicle to the discharge assembly and supplying single-phase AC power from the discharge assembly to the building through a single-phase three-line wiring when it is determined that the operation mode of the power supply system is the first operation mode and the discharge assembly is connected to the discharge port; and
selectively switching, by a mode switcher of the discharge assembly, between a first discharge path for the first operation mode and a second discharge path for the second operation mode via a switcher.

* * * * *